(12) United States Patent
Kamada

(10) Patent No.: US 10,162,220 B2
(45) Date of Patent: Dec. 25, 2018

(54) LIGHTING DEVICE, DISPLAY DEVICE, AND TELEVISION DEVICE

(71) Applicant: SHARP KABUSHIKI KAISHA, Sakai, Osaka (JP)

(72) Inventor: Kentaro Kamada, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/552,791

(22) PCT Filed: Feb. 24, 2016

(86) PCT No.: PCT/JP2016/055371
§ 371 (c)(1),
(2) Date: Aug. 22, 2017

(87) PCT Pub. No.: WO2016/136787
PCT Pub. Date: Sep. 1, 2016

(65) Prior Publication Data
US 2018/0031922 A1    Feb. 1, 2018

(30) Foreign Application Priority Data

Feb. 25, 2015 (JP) .................................. 2015-035189

(51) Int. Cl.
*G02F 1/1335* (2006.01)
*F21S 2/00* (2016.01)
*F21V 7/22* (2018.01)

(52) U.S. Cl.
CPC .......... *G02F 1/133611* (2013.01); *F21S 2/00* (2013.01); *F21V 7/22* (2013.01);
(Continued)

(58) Field of Classification Search
CPC ......... G02F 1/133611; G02F 1/133605; G02F 1/133621
(Continued)

(56) References Cited

U.S. PATENT DOCUMENTS 8,343,575 B2   1/2013  Dubrow
8,697,471 B2   4/2014  Dubrow
(Continued)

FOREIGN PATENT DOCUMENTS

CN   101451673 A   6/2009
JP   2013-544018 A  12/2013

*Primary Examiner* — Paultep Savusdiphol
(74) *Attorney, Agent, or Firm* — ScienBiziP, P.C.

(57) ABSTRACT

A lighting device 12 includes LEDs 17, a chassis 14 including a bottom plate 14a and having the LEDs 17 therein, a wavelength conversion sheet 20 disposed away from the LEDs 17 on a light exit side and containing phosphors for converting wavelength of light emitted by the LEDs 17, a reflection sheet 19 configured to reflect the light emitted by the LEDs 17 toward the wavelength conversion sheet 20, the reflection sheet 19 including at least a bottom reflection portion 19a disposed along the bottom plate 14a, and an extended reflection portion 19b extending from the bottom reflection portion 19a toward the wavelength conversion sheet 20, and a color exhibit member 23 disposed on a portion of the extended reflection portion 19b and configured to exhibit a tint closer to a tint of the light emitted by the LEDs 17 in comparison to the bottom reflection portion 19a.

15 Claims, 16 Drawing Sheets

(52) U.S. Cl.
CPC .. *G02F 1/133605* (2013.01); *G02F 1/133621* (2013.01); *G02F 2001/133614* (2013.01); *G02F 2202/36* (2013.01)

(58) Field of Classification Search
USPC .................. 362/84, 97.3, 293, 297, 307
See application file for complete search history.

(56) References Cited

U.S. PATENT DOCUMENTS

| | | | |
|---|---|---|---|
| 9,139,767 B2 | 9/2015 | Dubrow | |
| 9,199,842 B2 | 12/2015 | Dubrow | |
| 2004/0257797 A1* | 12/2004 | Suehiro | H01L 33/507 362/34 |
| 2009/0147497 A1 | 6/2009 | Nada | |
| 2010/0167011 A1 | 7/2010 | Dubrow | |
| 2010/0271807 A1 | 10/2010 | Chiu et al. | |
| 2012/0113672 A1 | 5/2012 | Dubrow | |
| 2012/0147292 A1 | 6/2012 | Kasano et al. | |
| 2013/0075014 A1 | 3/2013 | Dubrow | |
| 2013/0271700 A1* | 10/2013 | Nakamura | G02B 6/0026 349/65 |
| 2013/0271961 A1* | 10/2013 | Nakamura | F21V 9/00 362/97.2 |
| 2013/0294107 A1* | 11/2013 | Ohkawa | G02F 1/133615 362/606 |
| 2014/0178648 A1 | 6/2014 | Dubrow | |
| 2015/0023057 A1 | 1/2015 | Kim et al. | |
| 2015/0300600 A1 | 10/2015 | Dubrow | |
| 2015/0323726 A1* | 11/2015 | Nakamura | G02B 6/0026 362/606 |
| 2016/0009988 A1 | 1/2016 | Dubrow | |
| 2016/0349428 A1 | 12/2016 | Dubrow | |
| 2016/0363713 A1 | 12/2016 | Dubrow | |
| 2017/0090101 A1* | 3/2017 | Hayashi | G02B 6/0055 |
| 2017/0227701 A1* | 8/2017 | Nishikawa | G02B 6/005 |
| 2017/0261180 A1* | 9/2017 | Nakamura | F21V 9/00 |

* cited by examiner

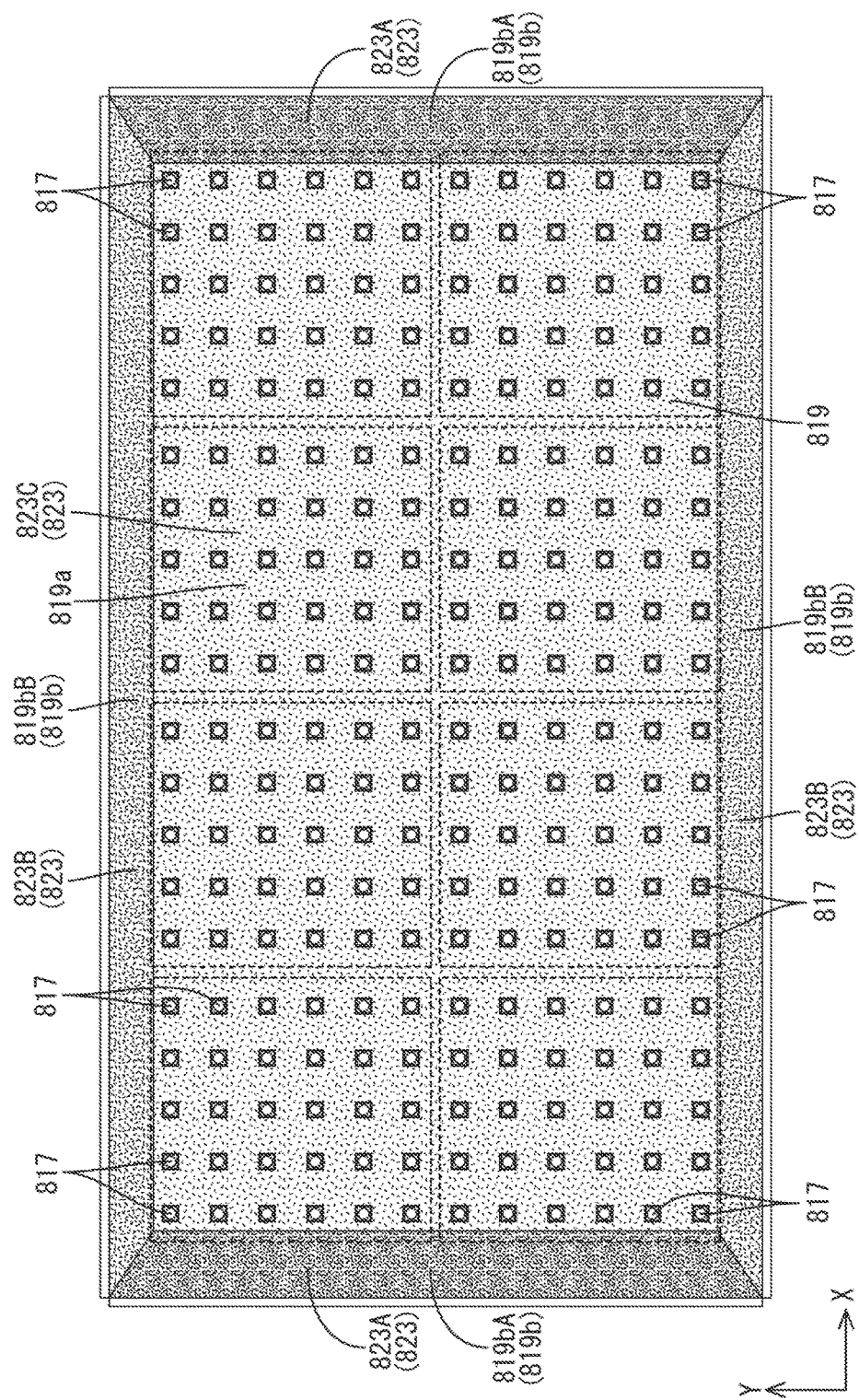

LIGHTING DEVICE, DISPLAY DEVICE, AND TELEVISION DEVICE

TECHNICAL FIELD

The present invention relates to a lighting device, a display device, and a television device.

BACKGROUND ART

An example of a liquid crystal display device is disclosed in Patent Document 1. The liquid crystal display device disclosed in Patent Document 1 includes a liquid crystal panel, and a display backlight unit that supplies light to the liquid crystal panel. The display backlight unit includes a primary light source, a light guide plate that guides primary light emitted by the primary light source, and a QD film that contains quantum dot phosphors that are excited by the primary light traveling through the light guide plate and output secondary light.

RELATED ART DOCUMENT

Patent Document
Patent Document 1 Japanese Translation of PCT International Application Publication No. 2013-544018

Problem to be Solved by the Invention

Following problems may be caused if the QD film described in Patent Document 1 is used in a direct-type backlight device. In the direct-type backlight device, light sources are arranged just below the liquid crystal panel. In such a backlight device, a light amount distribution of the primary light is high in a middle portion of the screen and is likely to be lower in an outer peripheral portion of the screen. If the primary light has such a light amount distribution, a ratio of the amount of the primary light rays and the amount of the secondary light rays, which are converted through the QD film, among the exit light rays from the backlight device is likely to be varied between the middle portion of the screen and the outer peripheral portion of the screen, and unevenness in color may be caused.

DISCLOSURE OF THE PRESENT INVENTION

An object of the present invention is to reduce occurrence of unevenness in color.

Means for Solving the Problem

To solve the above problem, a lighting device includes a light source having a light emission surface, a chassis including a bottom portion that is disposed on an opposite side of the light source from the light emission surface, and the chassis having the light source therein, a wavelength conversion member disposed opposite the light emission surface of the light source and away from the light emission surface on a light exit side and containing phosphors for converting wavelength of light emitted by the light source, a reflection member configured to reflect the light emitted by the light source toward the wavelength conversion member, the reflection member including at least a bottom reflection portion disposed along the bottom portion, and an extended reflection portion extending from the bottom reflection portion toward the wavelength conversion member, and a color exhibit member disposed on at least a portion of the extended reflection portion and configured to exhibit a tint closer to a tint of the light emitted by the light source in comparison to the bottom reflection portion.

According to such a configuration, the light emitted by the light source reflects off the reflection member and the wavelength of the light is converted by the phosphors contained in the wavelength conversion member that is disposed away from and opposite the light emission surfaces of the light source on the light exit side. Then, the light exits the wavelength conversion member. The color exhibit member is disposed on at least a part of the extended reflection portion of the reflection member. The reflected light reflecting off the extended reflection portion having the color exhibit member thereon has a tint closer to the tint of the light from the light source compared to the reflected light reflecting off the bottom reflection portion. Therefore, even if the amount of light rays emitted by the light source and reflecting off the extended reflection portion is smaller than the amount of light rays emitted by the light source and reflecting off the bottom reflection portion, difference in tint (tinted color) is less likely to be caused between the reflected light reflecting off the extended reflection portion and the reflected light reflecting off the bottom reflection portion. Further, even if the wavelength conversion efficiency of light by the wavelength conversion member and the multiple reflection between the optical member and the extended reflection portion is increased, difference in tint is less likely to be caused between the tint of the reflected light obtained through the multiple reflection and the tint of the reflected light reflecting off the bottom reflection portion. Therefore, unevenness in color is less likely to be caused in the exit light from the lighting device.

Following configurations may be preferable.

(1) The color exhibit member may have a light absorption rate with respect to light having a color that makes a complementary color pair with the light emitted by the light source higher than a light absorption rate with respect to the light emitted by the light source. Accordingly, among the reflected light rays reflecting off the extended reflection portion, the color exhibit member absorbs a relatively greater amount of the light rays that make a complementary color pair with the light from the light source than an amount of the light rays from the light source. Therefore, the tint of the reflected light reflecting off the extended reflection portion is closer to the tint of the light from the light source.

(2) The color exhibit member may have light reflectivity with respect to light having a color that makes a complementary color pair with the light emitted by the light source relatively higher than light reflectivity with respect to the light emitted by the light source. Accordingly, among the reflected light rays reflecting off the extended reflection portion, the color exhibit member reflects a relatively greater amount of the light rays from the light source than the amount of the light rays making a complementary color pair with the light from the light source. Therefore, the tint of the reflected light reflecting off the extended reflection portion is closer to the tint of the light from the light source.

(3) The color exhibit member may have a film shape and adheres to at least a surface of the extended reflection portion opposite the wavelength conversion sheet. According to such a configuration, a manufacturing cost is reduced compared to a configuration in that reflection sheets having different light absorption rates and reflectivity are manufactured for the extended reflection portions and the bottom reflection portion. Further, the reflection member can be used without including the color exhibit member and therefore, the reflection member can be commonly used for the reflection member including the color exhibit member and the reflection member without including the color exhibit member.

(4) The color exhibit member may be disposed on at least a surface of the extended reflection portion opposite the wavelength conversion sheet with coating. According to such a configuration, the manufacturing cost is lowered compared to a configuration in which reflection sheets having different light absorption rates or different reflectivity are manufactured for each of the extended reflection portion and the bottom reflection portion. The reflection member can be used without including the color exhibit member. Therefore, the reflection member is commonly used for the reflection member including the color exhibit member and the reflection member without including the color exhibit member.

(5) The color exhibit member on an extending distal end side of the extended reflection portion may exhibit a tint closer to a tint of the light emitted by the light source than the color exhibit member on an extending basal end side of the extended reflection portion. In the extended reflection portion, the amount of light rays from the light source is smaller at an extending distal end than at an extending basal end and the wavelength conversion efficiency of light by a wavelength conversion member and the multiple reflection between the optical member and the extended reflection portion is increased at the extending distal end than at the extending basal end. In the extended reflection portions, the color exhibit member has a tint closer to a tint of light from the light source at the extending distal end than at the extending basal end. Therefore, unevenness in color is less likely to be caused between the extending distal end side and the extending basal end side of the extended reflection portion.

(6) The extended reflection portion may include at least a first extended reflection portion and a second extended reflection portion. The first extended reflection portion may be inclined with respect to the bottom reflection portion at a relatively small inclination angle, the second extended reflection portion may be inclined with respect to the bottom reflection portion at a relatively great inclination angle, and the color exhibit member may be disposed at least on the first extended reflection portion. The first extended reflection portion is likely to receive a smaller amount of light rays emitted by the light source than the second extended reflection portion and likely to have higher wavelength conversion efficiency of light by the wavelength conversion member and the multiple reflection compared to the second extended reflection portion. Since the color exhibit member is disposed at least on the first extended reflection portion, unevenness in color that may be caused in the first extended reflection portion is at least reduced preferably.

(7) The color exhibit member may be disposed on the second extended reflection portion, and the color exhibit member disposed on the first extended reflection portion may exhibit a tint closer to the tint of the light emitted by the light source than a tint exhibited by the color exhibit member disposed on the second extended reflection portion. The color exhibit member is disposed on the second extended reflection portion such that unevenness in color that may be caused on the second extended reflection port on is preferably reduced. Further, the first color exhibit member disposed on the first extended reflection portion exhibits the tint closer to the tint of the light emitted by the light source than the second color exhibit member disposed on the second extended reflection portion. Accordingly, difference in tint between the reflected light reflecting off the first extended reflection portion and the reflected light reflecting off the second extended reflection portion is less likely to be caused and unevenness in color is preferably reduced.

(8) The color exhibit member may extend from the extended reflection portion to the bottom reflection portion. According to such a configuration, unevenness in color is less likely to be caused in both of the extended reflection portion and the bottom reflection portion.

(9) The color exhibit member may be selectively disposed on a border between the extended reflection portion and the bottom reflection portion. If a distance from the border between the extended reflection portion and the bottom reflection portion to the light source is large, unevenness in color may be caused locally in a portion near the border between the extended reflection portion and the bottom reflection portion. However, the color exhibit member is selectively disposed on the border between the extended reflection portion and the bottom reflection portion such that unevenness in color is preferably reduced.

(10) The color exhibit member may be disposed over an entire area of the extended reflection portion. According to such a configuration, difference in tint is less likely to be caused in the reflected light reflected by the extended reflection portion and the reflected light reflected by the bottom reflection portion.

(11) The light source may be configured to emit blue light, the wavelength conversion member may contain as the phosphors at least a green phosphor that corners the blue light into green light through wavelength conversion and a red phosphor that converts the blue light into red light through wavelength conversion, and the color exhibit member may be configured to exhibit a bluish tint in comparison to a tint exhibited by the bottom reflection portion. According to such a configuration, the reflected light reflecting off the extended reflection portion has a bluish tint closer to the blue light emitted by the light source compared to the reflected light reflecting off the bottom reflection portion. Therefore, even if the amount of light rays emitted by the light source and reflecting off the extended reflection portion is smaller than the amount of light rays emitted by the light source and reflecting off the bottom reflection portion, difference in tint is less likely to be caused between the reflected light reflecting off the extended reflection portion and the reflected light reflecting off the bottom reflection portion. Further, even if the wavelength conversion efficiency of light by the wavelength conversion member and the multiple reflection between the optical member and the extended reflection portion is increased and the ratio of green light and red light may be increased, difference in tint is less likely to be caused between the tint of the reflected light through the multiple reflection and the tint of the reflected light reflecting off the bottom reflection portion. Therefore, unevenness in color is less likely to be caused in the exit light from the lighting device.

(12) The wavelength conversion member may contain quantum dot phosphors as the phosphors. According to such a configuration, the wavelength conversion efficiency of light by the wavelength conversion member is further increased and purity of the color is higher.

Next, to solve the above problem, a display device includes the above lighting device and a display panel displaying images using light from the lighting device. According to the display device having such a configuration, unevenness in color of the exit light from the lighting device is less likely to be caused and display with good display quality can be achieved.

Further, to solve the above problem, a television device includes the above display device. The television device includes the display device that improves display quality and television images of good display quality can be displayed.

Advantageous Effect of the Invention

According to the present invention, unevenness in color is less likely to occur.

BRIEF DESCRIPTION OF THE DRAWINGS

FIG. 16 is a plan view of a backlight device according to a ninth embodiment of the present invention.

MODE FOR CARRYING OUT THE INVENTION

First Embodiment

Figure 1:
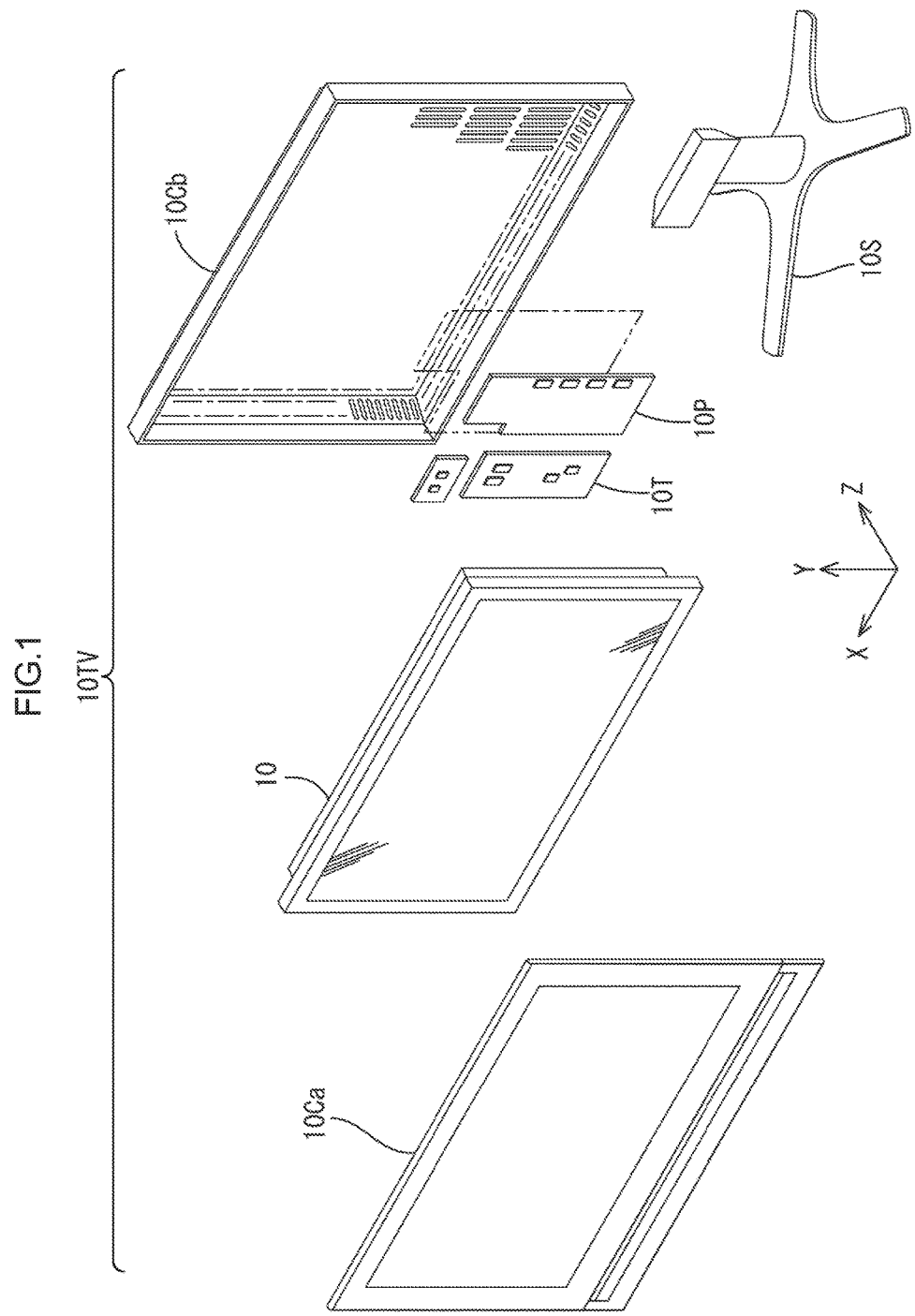
FIG. 1 is an exploded perspective view illustrating a general configuration of a television device according to a first embodiment of the present invention.

A first embodiment of the present invention will be described with reference to FIGS. 1 to 7. In the present embodiment, a liquid crystal display device 10 will be described as an example. X-axis, Y-axis and Z-axis may be present in the drawings and each of the axial directions represents a direction represented in each drawing. An upper side and a lower side in FIGS. 4 and 5 correspond to a front side and a back side, respectively.

Figure 2:
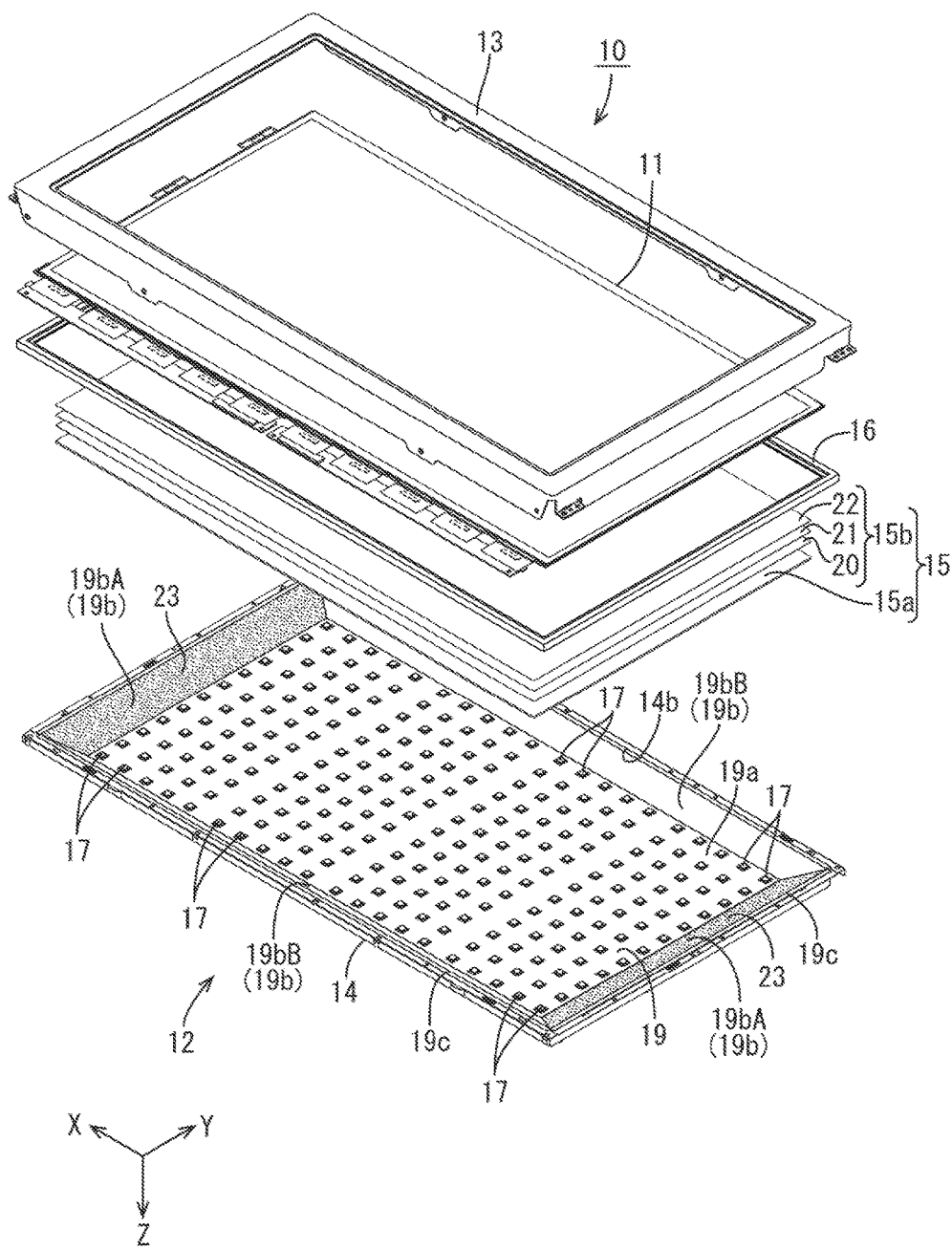
FIG. 2 is an exploded perspective view illustrating a general configuration of a liquid crystal display device included in the television device.

As illustrated in FIG. 1, a television device according to the present embodiment includes a liquid crystal display device 10, front and rear cabinets 10Ca, 10Cb that sandwich and hold the liquid crystal display device 10 therebetween, a power supply 10P, a tuner (a receiving portion) that receives television signals, and a stand 10S. The liquid crystal display device (a display device) 10 has horizontal (longitudinal) square (rectangular) shape as a whole and is arranged in a vertical position. As illustrated in FIG. 2, the liquid crystal display device 10 includes a liquid crystal panel 11 that is a display panel displaying images thereon, and a backlight device (a lighting device) 12 that is an external light source supplying light to the liquid crystal panel 11 for display. The liquid crystal panel 11 and the backlight device 12 are integrally held by a frame-shaped bezel 13.

Next, the liquid crystal panel 11 and the backlight device 12 included in the liquid crystal display device 10 will be described. The liquid crystal panel (a display panel) 11 has a horizontally elongated rectangular shape in a plan view. The liquid crystal panel 11 includes a pair of glass substrates that are bonded with a predetermined gap therebetween and liquid crystals are enclosed in a space between the glass substrates. On one of the glass substrates (an array substrate, an active matrix substrate), switching components (such as TFTs) that are connected to source lines and gate lines that are perpendicular to each other, pixel electrodes that are connected to the switching components, and alignment films are disposed. On another one of the glass substrates (a counter substrate, a CF substrate), a color filter including color portions of red (R), green (G), blue (B) with certain arrangement, counter electrodes, and alignment films are disposed. Polarizing plates are attached to the outer surfaces of the respective glass substrates.

Next, the backlight device 12 will be described in detail. As illustrated in FIG. 2, the backlight device 12 includes a chassis 14, an optical member 15, and a frame 16. The chassis 14 has a substantially box-shape and has a light exit portion 14b that is open toward the front side (a light exit side, a liquid crystal panel 11 side). The light exit portion 14b of the chassis 14 is covered with the optical member 15. The frame 16 extends along an outer edge portion of the chassis 14 and holds an outer edge portion of the optical member 15 between the frame 16 and the chassis 14. LEDs (light sources) 17, an LED board 18 where the LEDs 17 are mounted, and a light reflection sheet (a light reflecting member) 19 that reflects light within the chassis 14 are arranged in the chassis 14. In the backlight device 12 according to the present embodiment, the LEDs 17 are arranged within the chassis 14 directly below the liquid crystal panel 11 and the optical member 15 and light emission surfaces 17a of the LEDs 17 are opposite the liquid crystal panel 11 and the optical member 15. The backlight device 12 according to the present embodiment is a so-called direct-type backlight device. Hereinafter, components of the backlight devices 12 will be described.

Figure 3:
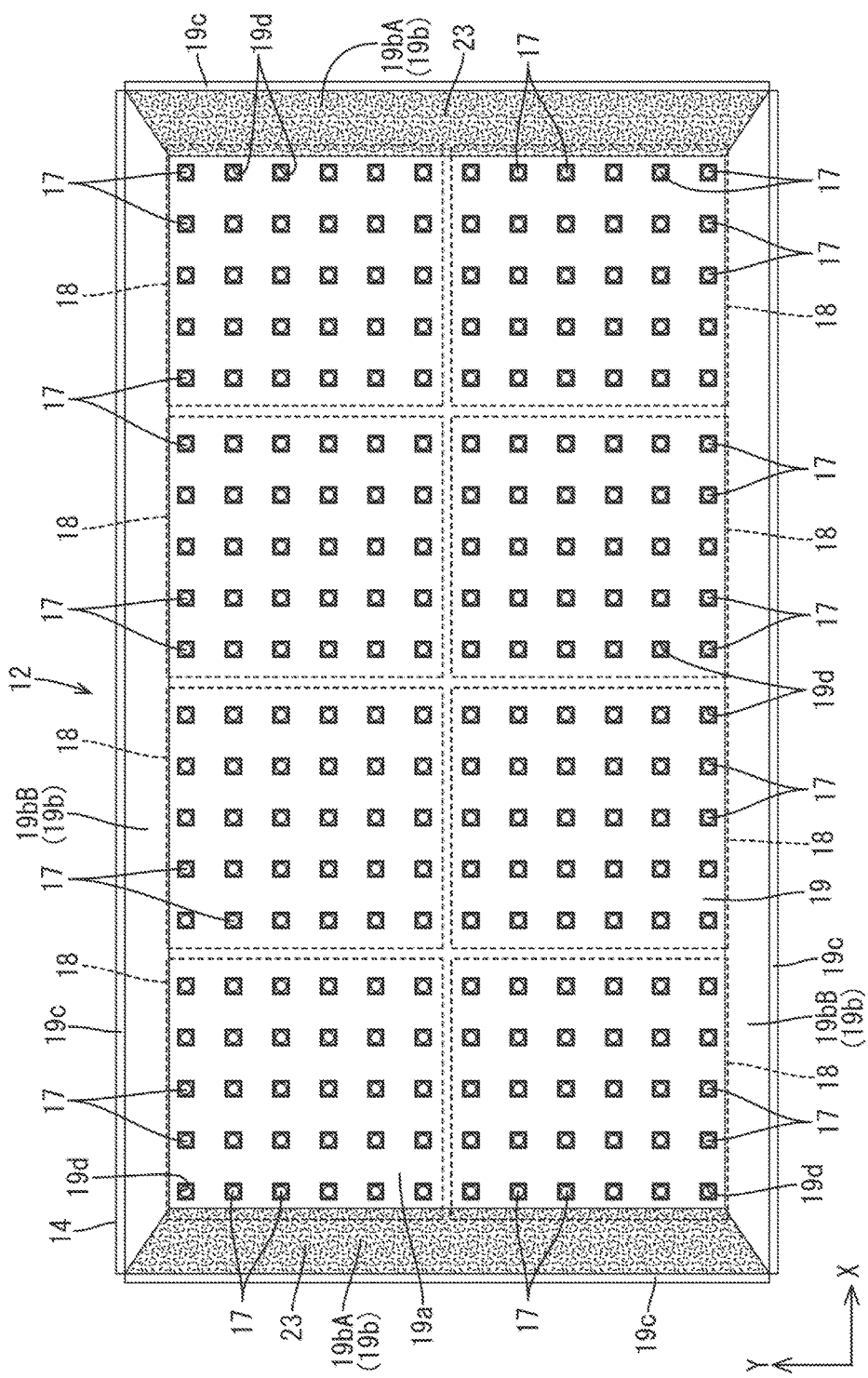
FIG. 3 is a plan view illustrating a backlight device included in the liquid crystal display device.
Figure 4:
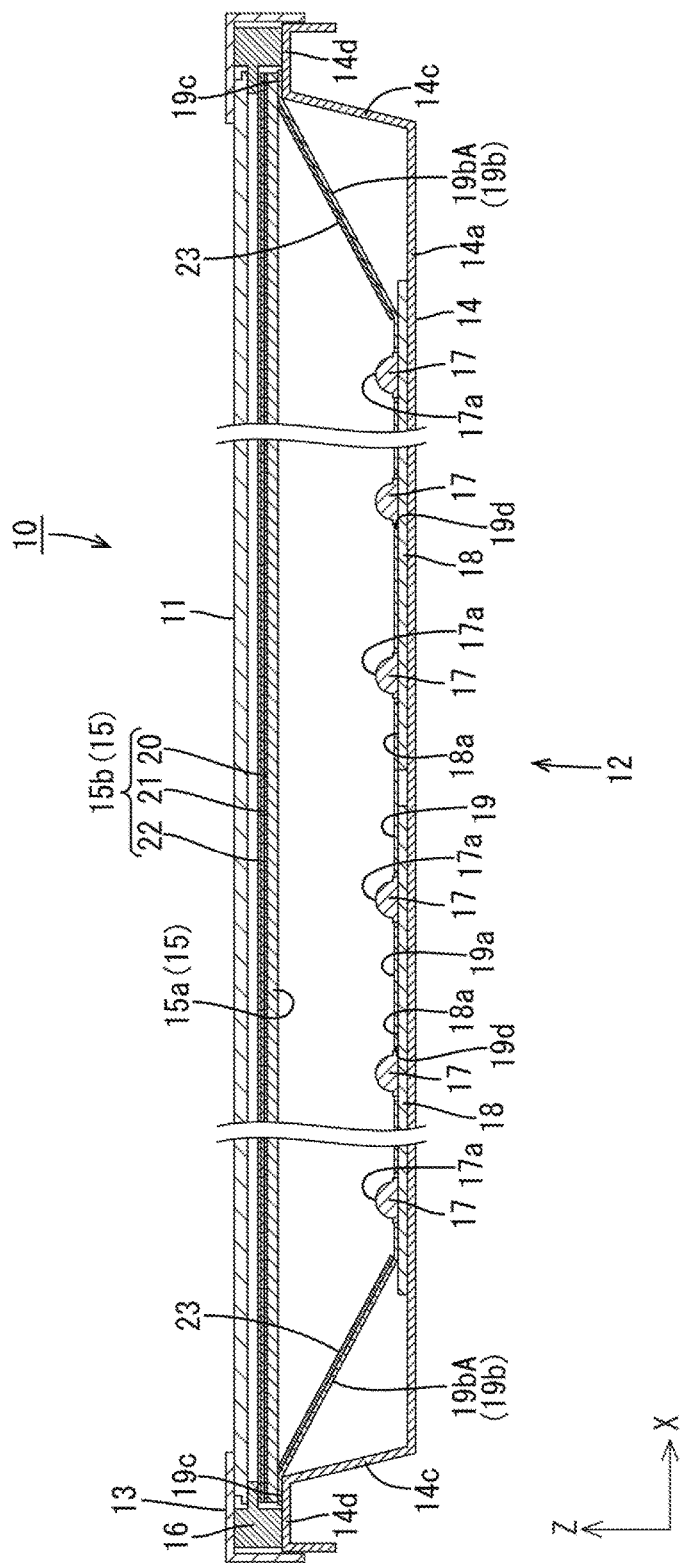
FIG. 4 is a cross-sectional view illustrating a cross-sectional configuration taken in a short-side direction of the liquid crystal display device.
Figure 5:
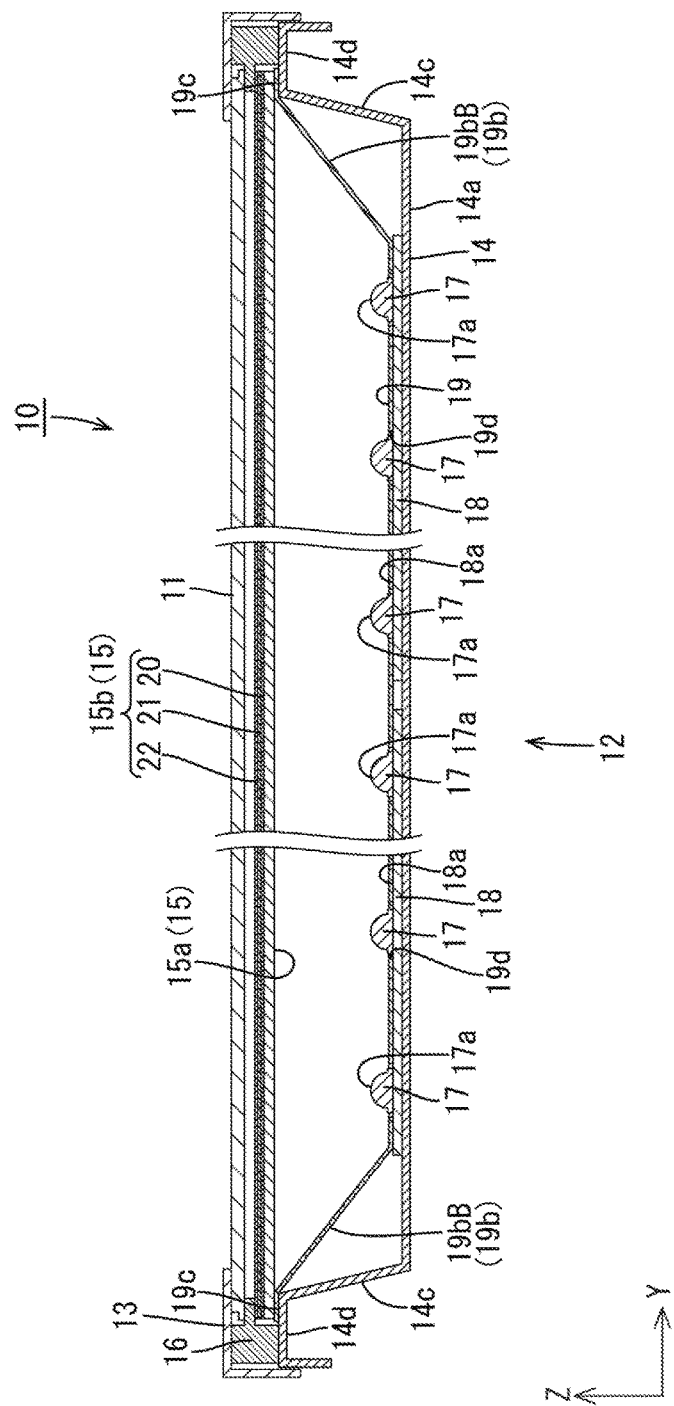
FIG. 5 is a cross-sectional view illustrating a cross-sectional configuration taken in a long-side direction of the backlight device.

The chassis 14 is made of a metal plate such as aluminum plate, or an electro-galvanized steel plate (SECC). As illustrated in FIGS. 3 to 5, the chassis 14 includes a bottom plate (a bottom portion) 14a that has an elongated rectangular plan view shape (a square, a rectangular shape) similar to the liquid crystal panel 11, side plates 14c each of which extends from an outer edge of each side (each of the long sides and each of the short sides) of the bottom plate 14a toward the front side (the light exit side), and a receiver plate (a receiver portion) 14d that extends outwardly from an extended end of each of the side plates 14c. The chassis 14 has substantially a shallow box shape (substantially shallow bowl shape) that opens frontward. In the chassis 14, a long-side direction matches the X-axis direction and a short-side direction matches the Y-axis direction. The bottom plate 14a of the chassis 14 is arranged on the back side with respect to the LED board 18, that is, on the opposite side with respect to the LEDs 17 from the light emission surface 17a side (the light exit side). Each of the side plates 14c of the chassis 14 is inclined with respect to the bottom plate 14a. The frame 16 and the optical member 15, which will be described later, can be placed on each of the receiver plates 14d of the chassis 14 from the front side. The frame 16 is fixed on each of the receiver plates 14d.

As illustrated in FIG. 2, the optical member 15 has a horizontally elongated rectangular plan view shape similar to the liquid crystal panel 11 and the chassis 14. As illustrated in FIGS. 4 and 5, an outer edge portion of the optical member 15 is placed on the receiver plate 14d such that the optical member 15 covers the light exit portion 14b of the chassis 14 and is between the liquid crystal panel 11 and the LEDs 17. The optical member 15 is opposite the light emission surfaces 17a of the LEDs 17 on the front side thereof and is opposite the LEDs 17 on the light exit side with a certain distance therebetween. The optical member 15 includes a diffuser plate 15a on a rear side thereof (on the LED 17 side, on an opposite side from the light exit side) and includes an optical sheet 15b on a front side (on the liquid crystal panel 11 side, on the light exit side). The diffuser plate 15a includes a substantially transparent resin substrate having a certain thickness and diffuser particles dispersed in the resin substrate and the diffuser plate 15a is configured to diffuse light transmitted therethrough. The optical sheet 15b is a sheet that is thinner than the diffuser plate 15a and includes three sheets layered on each other. The three sheets include a wavelength conversion sheet (a wavelength conversion member) 20 that converts wavelength of light emitted by the LEDs 17 into light having another wavelength. Specifically, the optical sheet 15b includes the wavelength conversion sheet 20, a prism sheet 21 layered on the wavelength conversion sheet 20 on the front, and a reflection type polarizing sheet 22 layered on the prism sheet 21 on the front. The wavelength conversion sheet 20 will be described in detail later.

The prism sheet 21 includes a substrate and a prism portion included on a front-side plate surface of the substrate. The prism portion includes unit prisms each of which extends in the X-axis direction and that are arranged in the Y-axis direction. According to such a configuration, light collecting effects are selectively exerted on the light rays, passing through the wavelength conversion sheet 20, with respect to the Y-axis direction (the arrangement direction in which the unit prisms are arranged, the direction perpendicular to the extending direction of each of the unit prisms) by the prism sheet 21 (anisotropic light collecting effects). The reflective-type polarizing sheet 22 includes a reflective-type polarizing film, and a pair of diffuser films that sandwich the reflective-type polarizing film from the front and rear sides. The reflective-type polarizing film has a multi-layer structure including layers having different refractive index layered on each other. Among the light rays exiting the prism sheet 21, p-wave is passed through the reflective-type polarizing film and s-wave is reflected by the reflective-type polarizing film to the rear side. The s-wave reflected by the reflective-type polarizing film reflects off a reflection sheet 19, which will be described later, again to the front side and separated into s-wave and p-wave. Thus, the reflective-type polarizing sheet 22 reflects the s-wave that is to be absorbed by the polarizing plate of the liquid crystal panel 11 if not including the reflective-type polarizing film. The reflective-type polarizing sheet 22 reflects the s-wave to the rear side (toward the reflection sheet 19) and the reflected s-wave can be reused and light use efficiency (brightness) can be improved. The pair of diffuser films are made of synthetic resin such as polycarbonate and are subjected to embossing processing on plate surfaces thereof opposite from the surfaces facing the reflective-type polarizing film. The embossed surfaces provide light with diffusion effect.

As illustrated in FIG. 2, the frame 16 extends along an outer peripheral edges of the liquid crystal panel 11 and the optical member 15. The frame 16 and each receiver plate 14d hold the outer peripheral edge portion of the optical member 15 therebetween (FIGS. 4 and 5). The frame 16 receives the outer peripheral edge portion of the liquid crystal panel 11 from the rear side and the outer peripheral edge portion of the liquid crystal panel 11 is held between the frame 16 and the bezel 13 that is arranged on the front side of the frame 16 (FIGS. 4 and 5).

Figure 6:
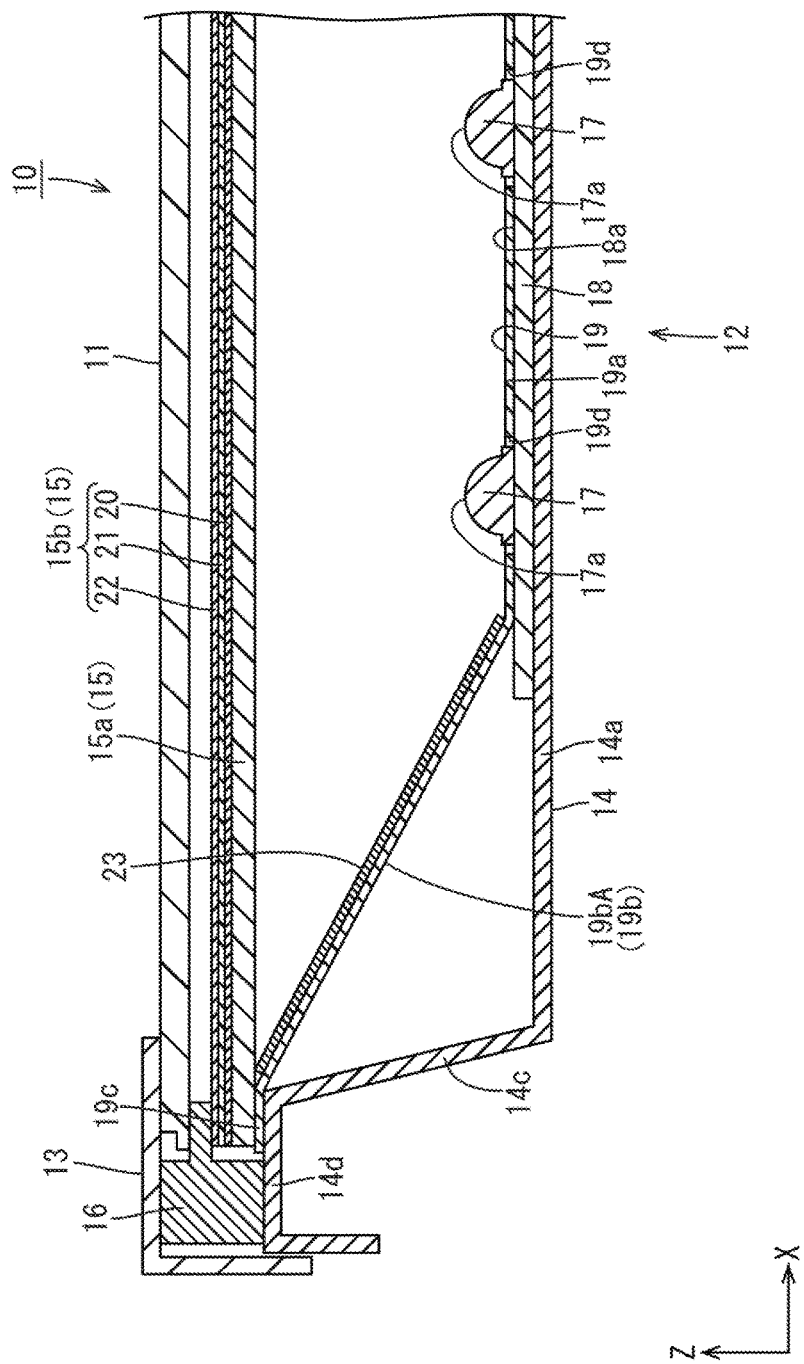
FIG. 6 is a magnified cross-sectional view of FIG. 4.
Figure 7:
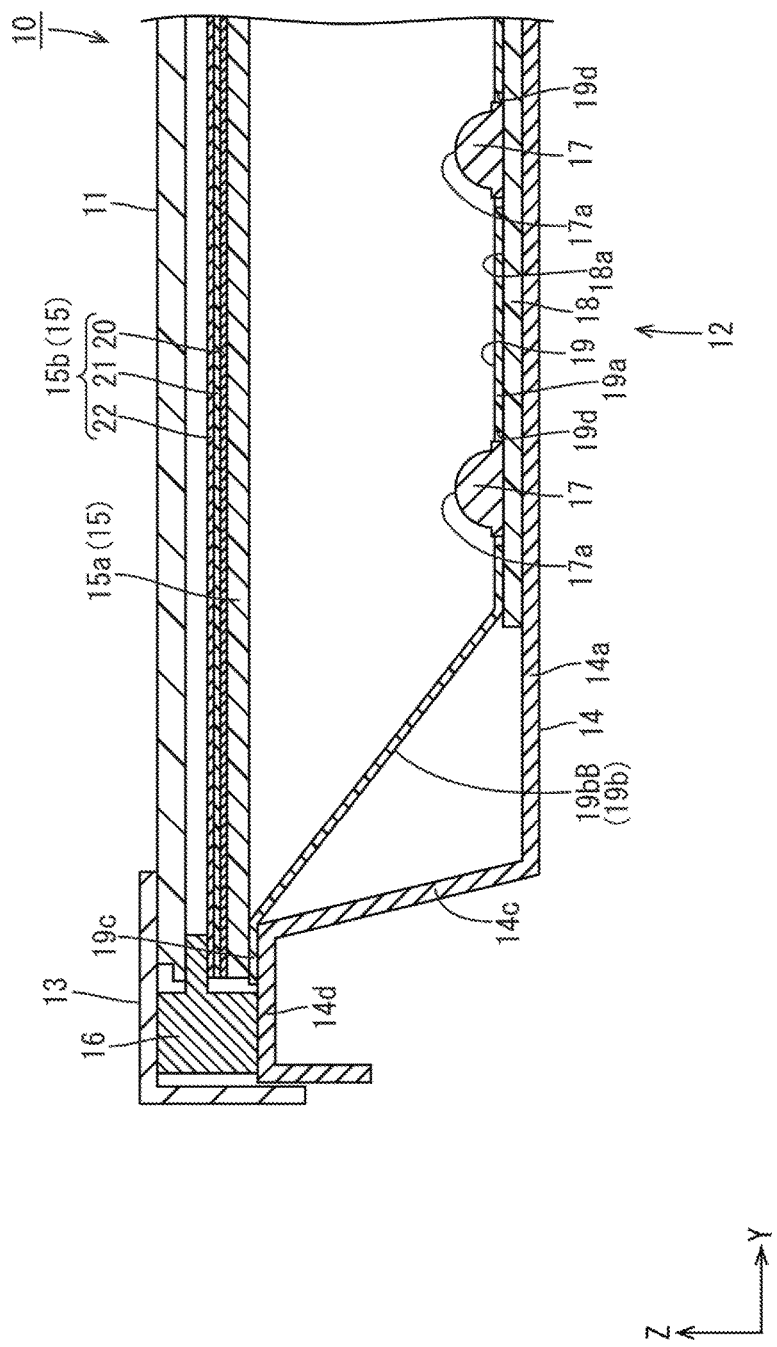
FIG. 7 is a magnified cross-sectional view of FIG. 5.

Next, the LEDs 17 and the LED board 18 where the LEDs 17 are mounted will be described. Each LED 17 is a so-called top-surface-emitting type LED. As illustrated in FIGS. 4 and 5, the LEDs 17 are surface-mounted on the LED board 18 such that the light emission surfaces 17a faces a side opposite from the LED board 18 side. An optical axis of the LEDs 17 matches the Z-axis direction and matches a normal line to a display surface of the liquid crystal panel 11 (a plate surface of the optical member 15). The "optical axis" in this specification is referred to as an axis of light rays that matches a travelling direction of light rays having highest light emission strength (having a peak) among light rays emitted by the LEDs 17. Specifically, as illustrated in FIGS. 6 and 7, each LED 17 includes a blue LED component (a blue light emitting component, a blue LED chip), a sealing member, and a case. The blue LED component is a light emitting source and the sealing member seals the blue LED component within the case. Each LED 17 is a blue LED configured to emit single blue light. A part of the blue light rays emitted by the LED 17 is converted into green light rays or red light rays having different wavelengths through the wavelength conversion sheet 20, which will be described later in detail. The green light rays and red light rays having converted wavelengths and blue light rays emitted by the LED 17 are mixed with additive color mixture such that substantially white light exits the backlight device 12. The blue LED component included in the LED 17 is a semiconductor made of InGaN, for example. When a forward bias is applied, the blue LED component emits light in a wavelength range of blue light (about 420 nm to about 500 nm), that is, blue light. The light emitted by the LED 17 is single color light having same color as that of light emitted by the blue LED component. The blue LED components are connected to tracing patterns via a lead frame, the tracing patterns are mounted on the LED board 18 that is arranged outside the case.

As illustrated in FIG. 3, the LED board 18 has a vertically elongated rectangular shape (a square shape, a rectangular shape) and is arranged in the chassis 14 along the bottom plate 14a such that a long-side direction thereof matches the Y-axis direction and a short-side direction hereof matches the X-axis direction. The LED board 18 includes a substrate that is made of metal such as aluminum material similar to that of the chassis 14 and tracing patterns (not illustrated) made of a metal film such as a copper foil are formed on a surface of the substrate via an insulation layer therebetween. A white reflection layer (not illustrated) is formed on an outermost surface of the LED board 18. The substrate of the LED board 18 may be made of insulation material such as ceramics. The above-structured LEDs 17 are surface-mounted on a plate surface of the substrate of the LED board 18 facing the front side (the plate surface facing the optical member 15), and the plate surface is the mounting surface 18a. The LEDs 17 are arranged in rows and columns (in a matrix) within a plane surface of the mounting surface 18a of the LED board 18 and are electrically connected to each other through trace patterns formed within the plane surface of the mounting surface 18a. Specifically, on the mounting surface 18a of the LED board 18, five (a relatively small number of) LEDs 17 are arranged in the short-side direction (the X-axis direction) and six (a relatively great number of) LEDs 17 are arranged in the long-side direction (the Y-axis direction). Thus, the LEDs 17 are arranged in rows and columns. Intervals between the LEDs 17 on the LED board 18 are substantially same and specifically, the LEDs 17 are arranged at equal intervals in the X-axis direction (a row direction) and in the Y-axis direction (a column direction).

As illustrated in FIG. 3, the LED boards 18 having the above structure are arranged in the X-axis direction and the Y-axis direction within the chassis 14 such that the short sides thereof are aligned with each other and the long sides thereof are aligned with each other. Specifically, four (a relatively great number of) LED boards 18 are arranged in the X-axis direction and two (a relatively small number of) LED boards 18 are arranged in the Y-axis direction within the chassis 14. The arrangement directions of the LED boards 18 match the X-axis direction and the Y-axis direction, respectively. The LED boards 18 are arranged at equal intervals in the X-axis direction and the Y-axis direction. The LEDs 17 are arranged at equal intervals in a matrix with respect to the X-axis direction (the row direction) and the Y-axis direction (the column direction) in a plane surface of the bottom plate 14a of the chassis 14. Specifically, twenty LEDs 17 are arranged in the long-side direction (the X-axis direction) and twelve LEDs 17 are arranged in the short-side direction (the Y-axis direction) in a matrix in a plane surface of the bottom plate 14a of the chassis 14. The optical member 15 is disposed to cover the light exit portion 14b of the chassis 14 and is opposite all the LED 17 groups with having a certain distance therebetween. Each of the LED boards 18 includes a connector portion to which traces (not illustrated) are connected and driving power is supplied from an LED driving board (a light source driving board), which is not illustrated, to each of the LED boards 18 through the traces.

The reflection sheet 19 is made of synthetic resin and has a white surface having good light reflectivity. The reflection sheet 19 does not absorb light having a specific wavelength at a surface thereof and irregularly reflects all the visible light. Therefore, the light reflectivity is substantially constant over an entire area of the reflection sheet 19. As illustrated in FIGS. 3 to 5, the reflection sheet 19 has a size that extends substantially an entire area of an inner surface of the chassis 14 and therefore, substantially an entire area of the LED boards 18 arranged in the chassis 14 can be covered with the reflection sheet 19 from the front side (the light exit side, the optical member 15 side). The reflection sheet 19 includes a bottom reflection portion 19a, four extended reflection portions 19b, and extended edge portions 19c. The bottom reflection portion 19a extends over the LED boards 18 (the bottom plate 14a) and collectively covers an entire area of the LED boards 18. Each of the four extended reflection portions 19b extends from each outer edge of the bottom plate 19a toward the front side and is inclined with respect to the bottom reflection portion 19a. Each of the extended edge portions 19c extends outwardly from an outer end of each extended reflection portion 19b and is placed on the receiver plate 14d of the chassis 14. The reflection sheet 19 is placed on the front surfaces of the LED boards 18 such that the bottom reflection portion 19a overlaps the mounting surfaces 18a of the LED boards 18 on the front side. The bottom reflection portion 19a of the reflection sheet 19 has LED insertion holes (light source insertion holes) 19d at positions overlapping the LEDs 17 in a plan view such that each of the LEDs 17 is separately inserted through each LED insertion hole 19d. The LED insertion holes 19d are arranged in a matrix with respect to the X-axis direction and the Y-axis direction corresponding to the arrangement of the LEDs 17.

As illustrated in FIG. 3, the extended reflection portions 19b include a pair of short-side extended reflection portions (a first extended reflection portion) 19bA and a pair of long-side extended reflection portions (a second extended reflection portion) 19bB. The short-side extended reflection portions 19bA extend from short-side outer edges of the bottom reflection portion 19a, respectively. The long-side extended reflection portions 19bB extend from long-side outer edges of the bottom reflection portion 19a, respectively. Hereinafter, the short-side extended reflection portions are represented by the symbol with "A" and the long-side extended reflection portions are represented by the symbol with "B" and the extended reflection portions 19b are provided with no added alphabets used as a generic term. As illustrated in FIG. 5, the short-side extended reflection portions 19bA are inclined at a relatively small inclination angle with respect to the bottom reflection portion 19a and have relatively gentle inclination. Each of the short-side extended reflection portions 19bA has a relatively long linear distance from an extending basal end position to an extending distal end position. Accordingly, the amount of light rays emitted by the LEDs 17 and reflected by the short-side extended reflection portions 19bA is relatively small. The light rays that are reflected by the short-side reflection portions 19bA upward and returned by the optical member 15 are likely to be reflected by the short-side reflection portions 19bA and multiple reflection is likely to occur at the short-side reflection portions 19bA and the optical member 15. As illustrated in FIG. 4, the long-side extended reflection portions 19bB are inclined at a relatively great inclination angle with respect to the bottom reflection portion 19a and have relatively sharp inclination. Each of the long-side extended reflection portions 19bB has a relatively short linear distance from an extending basal end position to an extending distal end position. Accordingly, the amount of light rays emitted by the LEDs 17 and reflected by the long-side extended reflection portions 19bB is relatively great. The light rays that are reflected by the long-side reflection portions 19bB upward and returned by the optical member 15 are less likely to be reflected by the short-side reflection portions 19bA and multiple reflection is less likely to occur at the long-side reflection portions 19bA and the optical member 15.

Next, the wavelength conversion sheet 20 will be described in detail. The wavelength conversion sheet 20 includes a phosphor layer (a wavelength converting layer) and a pair of protection layers sandwiching the phosphor layer therebetween from the front and rear sides and protect it. The phosphor layer contains phosphors (wavelength converting material) that convert wavelength of light rays emitted by the LEDs 17. The phosphor layer dispersedly contains red phosphors and green phosphors. The red phosphors are excited by single blue light emitted by the LEDs 17 and emit red light (visible light having a specific wavelength range of red) and the green phosphors are excited by the single blue light emitted by the LEDs 17 and emit green light (visible light having a specific wavelength range of green).

More in detail, the phosphors of each color contained in the phosphor layer are excited by the blue light and have light emission spectrum as follows. The green phosphors are excited by blue light and emit light having a wavelength of green (in a wavelength range from about 500 nm to about 570 nm). The green phosphors emit green light as fluorescence light. The green phosphors preferably have light emission spectrum such that a peak wavelength is about 530 nm within a wavelength range of green and a half width of the peak is less than 40 nm. The red phosphors are excited by blue light and emit light having a wavelength of red (in a wavelength range from about 600 nm to about 780 nm). The red phosphors emit red light as fluorescence light. The red phosphors preferably have light emission spectrum such that a peak wavelength is about 610 nm within a wavelength of red and a half width of the peak is less than 40 nm.

The phosphors of each color are down conversion-type (down shifting-type) phosphors, excitation wavelengths of which are shorter than fluorescence wavelengths. The down conversion-type phosphors convert excitation light having shorter wavelengths and high energy levels into fluorescence light having longer wavelengths and lower energy levels. In comparison to a configuration in which up conversion-type phosphors, the excitation wavelengths of which are longer than the fluorescent wavelengths (e.g., about 28% of quantum efficiency), the quantum efficiency (light conversion efficiency) is higher, which is about 30% to 50%. The phosphors of each color are quantum dot phosphors. The quantum dot phosphors include semiconductor nanocrystals (e.g., diameters in a range from 2 nm to 10 nm) which tightly confine electrons, electron holes, or excitons with respect to all direction of a three dimensional space to have discrete energy levels. A peak wavelength of emitting light (a color of emitting light) is freely selectable by changing the dot size. A light emission spectrum of the emitting light emitted by the quantum dot phosphors (fluorescence light) has a sharp peak and a half width of each peak is small, that is, purity of the color is very high and their color gamut is large. Materials used for the quantum dot phosphors include a material prepared by combining elements that could be divalent cations such as Zn, Cd, and Pb and elements that could be divalent anions such as O, S, Se, and Te (e.g., cadmium selenide (CdCe), zinc sulfide (ZnS), a material prepared by combining elements that could be trivalent cations such as Ga and In and elements that could be trivalent anions such as P, As, and Sb (e.g., indium phosphide (InP), gallium arsenide (GaAs), and chalcopyrite-type compounds (CuInSe2). In this embodiment, CdSe and AnS are used for the material of the quantum dot phosphors. The quantum dot phosphors in this embodiment are core-shell quantum dot phosphors. Each core-shell quantum dot phosphor includes a quantum dot and a shell that is made of a semiconductor material having a relatively large bandgap and covering the quantum dot. An example of the core-shell quantum dot phosphor is Lumidot (trademark) CdSe/ZnS manufactured by Sigma-Aldrich Japan LLC.

In the direct-type backlight device 12 according to this embodiment, the multiple LEDs 17 are arranged directly below the liquid crystal panel 11. In the light amount distribution within the backlight device 12, the amount of primary light emitted by the LEDs 17 is likely to be great in a middle portion of the screen and small in an outer peripheral portion of the screen. Such a light amount distribution is caused since the LEDs 17 are arranged only in an area of the bottom reflection portion 19a of the reflection sheet 19 and no LED 17 is arranged in an area of the extended reflection portions 19b. Namely, the LEDs 17 are arranged to overlap the bottom reflection portion 19a in a plan view and not to overlap each of the extended reflection portions 19b in a plan view. Therefore, the amount of light emitted by the LEDs 17 and reflected by the extended reflection portions 19b is relatively small. If such unevenness is caused in the light amount distribution of the primary light emitted by the LEDs 17, a ratio of the amount of the primary light and the amount of secondary light, which is converted through the wavelength conversion sheet 20, in the exit light rays exiting the backlight device 12 is likely to be different in the middle portion of the screen and in the outer peripheral portion of the screen, and color unevenness may be caused. Specifically, in the outer peripheral portion of the screen, the light amount of the primary light emitted by the LEDs 17 is relatively small. Further, the light reflected by the extended reflection portions 19b is likely to be multiply reflected between the extended reflection portions 19b and the optical member 15 since the distance between the extended reflection portions 19b and the optical member 15 is relatively small. Accordingly, the wavelength conversion efficiency by the wavelength conversion sheet 20 is relatively high in the outer peripheral portion of the screen. Accordingly, the exit light is likely to be tinged with yellow in the outer peripheral portion of the screen.

In the backlight device 12 according to this embodiment, as illustrated in FIGS. 3 and 6, the extended reflection portions 19b of the reflection sheet 19 include color exhibit members 23 that exhibit tint (color) close to the tint (color) of light emitted by the LEDs 17 in comparison to a tint exhibited by the bottom reflection portion 19a. Specifically, the bottom reflection portion 19a that exhibits white and the color exhibit members 23 exhibit a bluish tint that is the tint of the light from the LED 17. The color exhibit member 23 includes a film of a reflecting substrate having a white surface and a coloring material (including pigments or dye) exhibiting blue that is coated over a surface of the reflecting substrate (including a surface opposite the wavelength conversion sheet 20). The coloring material included in the color exhibit member 23 and exhibiting blue has an absorption rate with respect to yellow light that makes a complementary color pair with blue light, which is light (primary light) emitted by the LEDs 17. The absorption rate of the coloring material on the color exhibit member 23 is relatively higher than an absorption rate of the coloring material with respect to yellow light on the bottom reflection portion 19a of the reflection on sheet 19. The "yellow light" in this specification includes light having an emission wavelength in a yellow wavelength range (approximately 570 to 600 nm) and also includes combined light combining light rays having an emission wavelength in a green wavelength range (green light emitted by the green phosphors) and light rays having an emission wavelength in a red wavelength range (red light emitted by the red phosphors). Therefore, the reflectivity of the color exhibit member 23 with respect to blue light is relatively higher than the reflectivity of the bottom reflection portion on 19a of the reflection sheet 19 with respect to the blue light, and the reflectivity of the color exhibit member 23 with respect to yellow light is relatively lower than the reflectivity of the bottom reflection portion 19a of the reflection sheet 19 with respect to yellow light. Namely, the color exhibit member 23 reflects a small amount of yellow light rays and reflects a great amount of blue light rays and has a light reflecting function with selecting wavelength. Accordingly, light reflecting off the extended reflection portions 19b having the color exhibit members 23 thereon is more bluish than light reflecting off the bottom reflecting portion 19a and has a tint closer to the tint of the blue light from the LEDs 17. Among the light rays emitted by the LEDs 17, the amount of light rays reflecting off the extended reflection portions 19b having the color exhibit members 23 thereon (the primary light) may be smaller than the amount of light rays reflecting off the bottom reflection portion 19a (the primary light). Even in such a case, difference in tint is less likely to be caused in the reflected light reflected by the extended reflection portions 19b having the color exhibit members 23 thereon and the reflected light reflected by the bottom reflection portion 19a. Further, even if multiple reflection occurs between the extended reflection portions 19b having the color exhibit members 23 and the optical member 15 and the wavelength conversion efficiency of light by the wavelength conversion sheet 20 may be locally increased, the difference is less likely to be caused between the tint of the light with multiple reflection and the tint of light reflecting off the bottom reflection portion 19a. Therefore, unevenness in color is less likely to be caused in the exit light from the backlight device 12. In FIGS. 2 and 3, a portion where the color exhibit member 23 is formed is illustrated with shading and a density of bluish tint (color) is represented by the density of the shading. Namely, as the density of the shading is increased in FIGS. 2 and 3, the bluish tint (color) is darker, and as the density of the shading is decreased, the bluish tint (color) is lighter.

More specifically, as illustrated in FIGS. 3, 6 and 7, among the extended reflection portions 19b, the pair of long-side extended reflection portions 19bB do not include the color exhibit member 23 and only the pair of short-side extended reflection portions 19bA include the color exhibit members 23. Among the extended reflection portions 19b, the pair of short-side reflection portions 19bA are inclined at a relatively small inclination angle with respect to the bottom reflection portion 19a and the color exhibit members 23 are selectively disposed on the short-side extended reflection portions 19bA. The short-side extended reflection portions 19bA having the relatively small inclination angle have a plan-view distance from the extending distal end to the extending basal end or to the bottom reflection portion 19a, and the plan-view distance of the short-side extended reflection portion 19bA is relatively greater than that of the long-side extended reflection portion 19bB having the relatively great inclination angle. The short-side extended reflection portions 19bA receive less amount of blue light from the LEDs 17 and the wavelength conversion efficiency of light by the wavelength conversion sheet 20 and the multiple reflection is likely to be increased. Since the color exhibit members 23 are selectively disposed on the short-side extended reflection portions 19bA, difference in tint that may be caused in the reflected light reflected by the short-side extended reflection portions 19bA and the reflected light reflected by the long-side extended reflection portions 19bB is reduced. Accordingly, difference in tint is less likely to be caused in the rays of light reflecting off the extended reflection portions 19b.

As illustrated in FIG. 3, the long-side extended reflection portions 19bB have a plan-view distance from the extending distal end to the extending basal end (to the bottom reflection portion 19a) that is relatively smaller than that of the short-side extended reflection portions 19bA. Therefore, not a few amount of blue light from the LEDs 17 reaches the long-side extended reflection portions 19bB and the wavelength conversion efficiency of light by the wavelength conversion sheet 20 and the multiple reflection is less likely to be increased. Accordingly, the difference in tint that may be caused in the reflected light reflected by the long-side extended reflection portions 19bB and the reflected light reflected by the bottom reflection portion 19a is in an allowable range. Therefore, in this embodiment, the color exhibit members 23 are not disposed on the long-side extended reflection portions 19bB.

As illustrated in FIG. 6, the color exhibit member 23 is disposed on substantially an entire area of each short-side extended reflection portion 19bA. Accordingly, difference in tint is less likely to be caused in the reflected light reflected by the short-side extended reflection portions 19bA and the reflected light reflected by the bottom reflection portion 19a. The coloring material coated on the reflecting substrate of each color exhibit member 23 has a density distribution that is substantially constant over an entire area of the reflecting substrate. The color exhibit member 23 is formed in a film shape, as described before, and is bonded on the front surface (a surface opposite the wavelength conversion sheet 20) of each short-side extended reflection portion 19bA so as to be integrally disposed on the short-side extended reflection portion 19bA. According to such a configuration, the manufacturing cost is lowered compared to a configuration in which reflection sheets having different light absorption rates or different reflectivity are manufactured for each of the short-side extended reflection portions and the bottom reflection portion. The reflection sheet 19 can be used without including the color exhibit members 23. Therefore, the reflection sheet 19 is commonly used for the reflection sheet 19 including the color exhibit members 23 and the reflection sheet 19 without including the color exhibit members 23.

Operations of the device having the above configuration according to this embodiment will be described. When the liquid crystal display device 10 is turned on, various signals relating display output from a control board (not illustrated) are transmitted to the liquid crystal panel 11 to control the driving of the liquid crystal panel 11 and control the driving of the LEDs 17 on the LED board 18 by an LED driving circuit board (not illustrated). As illustrated in FIGS. 4 and 5, the light emitted by the LEDs 17 that are turned on may directly reach the optical member 15 and may reflect off the reflection sheet 19 and indirectly reach the optical member 15. Predefined optical effects are exerted on the light by the optical member 15 and the light is directed toward the liquid crystal panel 11. Accordingly, the light emitted by the lighted LEDs 17 is used for displaying images in a display area of the liquid crystal panel 11.

Next, optical effects of the backlight device 12 (except for optical effects of the reflection sheet 19 and the light exhibit members 23, which will be described later) will be described in detail. As illustrated in FIGS. 4 and 5, the diffusing effects are exerted on the blue light rays emitted by the LEDs 17 (the primary light rays) by the diffuser plate 15a of the optical member 15 and some of the blue light rays are converted to the green light rays and the red light rays by the wavelength conversion sheet 20 of the optical member 15. The green light rays and the red light rays (secondary light rays) obtained through the wavelength conversion and the blue light rays (primary light rays) from the LEDs 17 form substantially white illumination light. The selective light collecting effects (the anisotropic light collecting effects) are exerted on the blue light rays from the LEDs 17 (primary light rays), and the green light rays and the red light rays (secondary light rays) obtained through the wavelength conversion with respect to the Y-axis direction by the prism sheet 21. Specific polarized light rays (p-wave) are selectively passed through the reflective-type polarizing sheet 22 and directed to the liquid crystal panel 11. Specific polarized light rays (s-wave) other than the specific polarized light rays described above are selectively reflected to the rear side. The s-wave reflected by the reflective-type polarizing sheet 22, the light rays reflected to the rear side without the light collecting effects by the prism sheet 21, or the light rays reflected to the rear side by the diffuser sheet 15a are reflected again by the reflection sheet 19, which will be described later, to travel to the front side.

Next, optical effects of the reflection sheet 19 and the color exhibit members 23 will be described in detail. The bottom reflection portion 19a and the extended reflection portions 19b of the reflection sheet 19 reflect the blue light rays emitted by the LEDs 17 (the primary light rays) and the light rays returned rearward by the optical member 15 toward the front side. The pair of short-side extended reflection portions 19bA of the extended reflection portions 19b include the color exhibit members 23 that exhibit blue that is a same color as the light emitted by the LEDs 17 (the primary light). Therefore, the color exhibit members 23 included in the short-side extended reflection portions 19bA effectively reflect the blue light rays (the primary light) and absorb more amount of yellow light rays (green light and red light, the secondary light). Specifically, the short-side extended reflection portions 19bA have a plan-view distance from the extending distal end to the extending basal end or to the bottom reflection portion 19a that is relatively greater than that of the long-side extended reflection portions 19bB. The short-side extended reflection portions 19bA receive less amount of blue light from the LEDs 17 and the wavelength conversion efficiency of light by the wavelength conversion sheet 20 and the multiple reflection between the optical member 15 and the short-side extended reflection portion 19bA is likely to be increased. Since the color exhibit members 23 are selectively disposed on the short-side extended reflection portions 19bA, difference in tint that may be caused in the reflected light reflected by the short-side extended reflection portions 19bA and the reflected light reflected by the bottom reflection portions 19a is reduced. Accordingly, evenness in tint is likely to be achieved in the outer peripheral portion of the screen and the middle portion of the screen and unevenness in color is less likely to be caused. Further, the color exhibit members 23 are disposed over substantially an entire area of each of the short-side extended reflection portions 19bA. Therefore, the reflected light reflecting off the short-side extended reflection portions 19bA is likely to have a tint closer to the tint of the reflected light reflecting off the long-side extended reflection portions 19bB or the bottom reflection portion 19a. Thus, the unevenness in color is much less likely to be caused.

As described before, the backlight device (the lighting device) 12 of this embodiment at least includes the LEDs (the light source) 17, the chassis 14, the wavelength conversion sheet (a wavelength conversion member) 20, the reflection sheet 19, and the color exhibit member 23. The chassis 14 includes the bottom plate (the bottom portion) 14a that is disposed on a side opposite from the light emission surface 17a side with respect to the LEDs 17 and the LEDs 17 are arranged in the chassis 14. The wavelength conversion sheet 20 is disposed opposite the light emission surfaces 17a of the LEDs 17 and away from the light emission surfaces 17a on the light exit side. The wavelength conversion sheet 20 contains the phosphors that convert the wavelength of light emitted by the LEDs 17. The reflection sheet includes the bottom reflection portion 19a disposed along the bottom plate 14a, and the extended reflection portions 19b extending from the bottom reflection portion 19a toward the wavelength conversion sheet 20. The color exhibit member 23 is disposed on at least a part of the extended reflection portions 19b and exhibits a color that is closer to a color of light from the LEDs 17 in comparison to a color of light reflected by the bottom reflection portion 19a.

According to such a configuration, the light rays emitted by the LEDs 17 reflect off the reflection sheet 19 and the wavelength of the light rays is converted by the phosphors contained in the wavelength conversion sheet 20 that is disposed opposite and away from the light emission surfaces 17a of the LEDs 17 on the light exit side. Then, the light rays exit the wavelength conversion sheet 20. The color exhibit member 23 is disposed on at least a part of the extended reflection portions 19b of the reflection sheet 19. The reflected light reflecting off the extended reflection portion 19b having the color exhibit member 23 thereon has a tint closer to the tint of the light from the LEDs 17 compared to the reflected light reflecting off the bottom reflection portion 19a. Therefore, even if the amount of light rays emitted by the LED 17 and reflecting off the extended reflection portions 19b is smaller than the amount of light rays emitted by the LEDs 17 and reflecting off the bottom reflection portion 19a, difference in tint (tinted color) is less likely to be caused between the reflected light reflecting off the extended reflection portions 19b and the reflected light reflecting off the bottom reflection portion 19a. Further, even if the wavelength conversion efficiency of light by the wavelength conversion sheet 20 and the multiple reflection between the optical member 15 and the short-side extended reflection portion 19bA is increased, difference in tint is less likely to be caused between the tint of the reflected light obtained through the multiple reflection and the tint of the reflected light reflecting off the bottom reflection portion 19a. Therefore, unevenness in color is less likely to be caused in the exit light from the backlight device 12.

The color exhibit member 23 has the light absorption rate with respect to light that makes a complementary color pair with the light from the LEDs 17 higher than the light absorption rate with respect to the light from the LEDs 17. Accordingly, among the reflected light rays reflecting off the extended reflection portions 19b, the color exhibit members 23 absorbs a relatively greater amount of the light rays that make a complementary color pair with the light from the LEDs 17 than an amount of the light rays from the LEDs 17. Therefore, the tint of the reflected light reflecting off the extended reflection portions 19b is closer to the tint of the light from the LEDs 17.

The reflectivity of the color exhibit members 23 with respect to the light rays from the LEDs 17 is relatively higher than the reflectivity of the color exhibit members 23 with respect to the light rays that make a complementary color pair with the light from the LEDs 17. Accordingly, among the reflected light rays reflecting off the extended reflection portions 19b, the color exhibit members 23 reflect a relatively greater amount of the light rays from the LEDs 17 than the amount of the light rays making a complementary color pair with the light from the LEDs 17. Therefore, the tint of the reflected light reflecting off the extended reflection portions 19b is closer to the tint of the light from the LEDs 17.

The color exhibit member 23 is formed in a film shape and bonded on at least a surface of each extended reflection portion 19b opposite the wavelength conversion sheet 20. According to such a configuration, a manufacturing cost is reduced compared to a configuration in that reflection sheets having different light absorption rates and reflectivity are manufactured for the extended reflection portions and the bottom reflection portion. Further, the reflection sheet 19 can be used without including the color exhibit members 23 and therefore, the reflection sheet 19 can be commonly used for the reflection sheet 19 including the color exhibit members 23 and the reflection sheet 19 without including the color exhibit members 23.

The extended reflection portions 19b at least include the short-side extended reflection portions (a first extended reflection portion) 19bA that are inclined at a relatively small inclination angle with respect to the bottom reflection portion 19a and the long-side extended reflection portions (a second extended reflection portion) 19bB that are inclined at a relatively great inclination angle with respect to the bottom reflection portion 19a. The color exhibit members 23 are disposed at least on the short-side extended reflection portions 19bA. The short-side extended reflection portions 19bA are likely to receive a smaller amount of light rays emitted by the LEDs 17 than the long-side extended reflection portions 19bB and likely to have higher wavelength conversion efficiency of light by the wavelength conversion sheet 20 and the multiple reflection compared to the long-side extended reflection portions 19bB. Since the color exhibit members 23 are disposed at least on the short-side extended reflection portions 19bA, unevenness in color that may be caused in the short-side extended reflection portions 19bA is at least reduced preferably.

The color exhibit member 23 is disposed over an entire area of the extended reflection portion 19b. According to such a configuration, difference in tint is less likely to be caused in the reflected light reflected by the extended reflection portions 19b and the reflected light reflected by the bottom reflection port on 19a.

The LEDs 17 emit blue light and the wavelength conversion sheet 20 includes at least the green phosphors that convert the blue light into green light through the wavelength conversion and the red phosphors that convert the blue light into red light through the wavelength conversion, as the phosphors. The color exhibit members 23 exhibit a bluish tint compared to the bottom reflection portion 19a. According to such a configuration, the reflected light reflecting off the extended reflection portions 19b has a bluish tint closer to the blue emitted by the LEDs 17 compared to the reflected light reflecting off the bottom reflection portion 19a. Therefore, even if the amount of light rays emitted by the LEDs 17 and reflecting off the extended reflection portions 19b is smaller than the amount of light rays emitted by the LEDs 17 and reflecting off the bottom reflection portion 19a, difference in tint is less likely to be caused between the reflected light reflecting off the extended reflection portions 19b and the reflected light reflecting off the bottom reflection portion 19a. Further, even if the wavelength conversion efficiency of light, by the wavelength conversion sheet 20 and the multiple reflection between the optical member 15 and the extended reflection portions 19b is increased and the ratio of green light and red light may be increased, difference in tint is less likely to be caused between the tint of the reflected light through the multiple reflection and the tint of the reflected light reflecting off the bottom reflection portion 19a. Therefore, unevenness in color is less likely to be caused in the exit light from the backlight device 12.

The wavelength conversion sheet 20 contains quantum dot phosphors as the phosphors. Accordingly, the wavelength conversion efficiency of light by the wavelength conversion sheet 20 is further increased and purity of the color is higher.

The liquid crystal display device 10 according to this embodiment includes the above backlight device 12, and the liquid crystal panel (the display panel) 11 that displays images with using light supplied by the backlight device 12. According to the liquid crystal display device 10 having the above structure, unevenness in color of the exit light from the backlight device 12 is less likely to be caused and display with good display quality can be achieved.

The television device 10TV according to this embodiment includes the above display device. According to the television device 10TV, display quality of the liquid crystal display device 10 is good and display with good display quality can be achieved.

Second Embodiment

A second embodiment of the present invention will be described with reference to FIG. 8. In the second embodiment, color exhibit members 123 have a density distribution of coloring material different from that of the first embodiment. Configurations, operations, and effects similar to those of the first embodiment will not be described.

Figure 8:
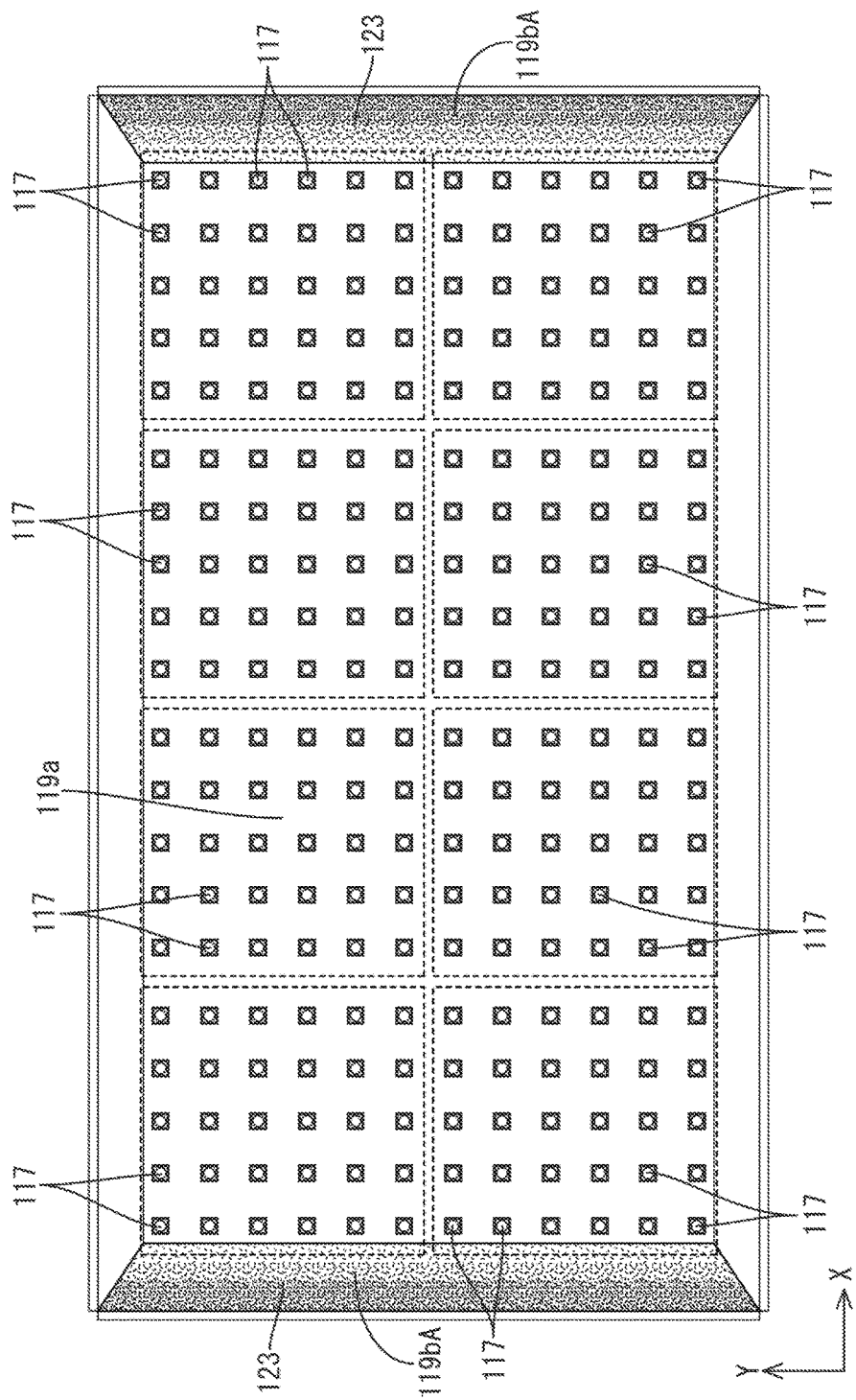
FIG. 8 is a plan view of a backlight device according to a second embodiment of the present invention.

As illustrated in FIG. 8, the color exhibit members 123 according to this embodiment have the density distribution of the coloring material that changes within a surface plane of a reflection substrate. Specifically, the density of the coloring material contained in the color exhibit members 123 is changed according to a distance from a bottom reflection portion 119a. The density of the coloring material is lower as is closer to the bottom reflection portion 119a or closer to the extending basal end of a short-side extended reflection portion 119bA. The density of the coloring material is higher as is farther away from the bottom reflection portion 119a or closer to the extending distal end of the short-side extended reflection portion 119bA. Namely, the bluish tint of a surface of each color exhibit member 123 is lighter and closer to white that is a tint exhibited by the bottom reflection portion 119a as is closer to the extending basal end (the bottom reflection portion 119a) of the short-side extended reflection portion 119bA. The bluish tint of a surface of each color exhibit member 123 is darker and closer to the tint of light emitted by LEDs 117 as is closer to the extending distal end of the short-side extended reflection portion 119bA (farther away from the bottom reflection portion 119a). As the bluish tint of a surface of each color exhibit member 123 is darker, the color exhibit members 123 have higher reflectivity with respect to the blue light (the primary light) and a lower absorption rate with respect to the yellow light (green light and red light, the secondary light). As the bluish tint of a surface of each color exhibit member 123 is lighter, the color exhibit members 123 have lower reflectivity with respect to the blue light and a higher absorption rate with respect to the yellow light. Therefore, the color exhibit members 123 have lower reflectivity with respect to the blue light and a higher absorption rate with respect to the yellow light as is closer to the extending basal end of each short-side extended reflection portion 119bA. The color exhibit members 123 have higher reflectivity with respect to the blue light and a lower absorption rate with respect to the yellow light as is closer to the extending distal end of each short-side extended reflection portion 119bA. In the color exhibit members 123, the density of the coloring material and the bluish tint of the surfaces of the color exhibit member 123 are continuously and gradually changed from the extending basal end of each short-side extended reflection portion 119bA toward the extending distal end thereof. In FIG. 8, a portion where the color exhibit member 123 is formed is illustrated with shading and a density of bluish color is represented by the density of the shading. Namely, as the density of the shading is increased in FIG. 8, the bluish color is darker, and as the density of the shading is decreased, the bluish color is lighter.

In the short-side extended reflection portions 119bA having the color exhibit members 123, the amount of light rays from the LEDs 117 is smaller at the extending distal end than at the extending basal end and the wavelength conversion efficiency of light by a wavelength conversion sheet and the multiple reflection between the optical member and the extended reflection portions 119bA is increased at the extending distal end than at the extending basal end. In the short-side extended reflection portions 119bA, the color exhibit members 123 have a darker bluish tint at the extending distal end than at the extending basal end and the tint close to the light emitted by the LEDs 117 is exhibited at the extending distal end portion. Therefore, unevenness in color is less likely to be caused between the extending distal end side and the extending basal end side of the short-side extended reflection portions 119bA.

As described before, according to this embodiment, in the color exhibit members 123 exhibit a tint that is closer to the tint of light emitted by the LEDs 117 at the extending distal end portion than the extending basal end portion of the extended reflection portions 119b. The amount of light rays from the LEDs 117 is smaller at the extending distal end port on than the extending basal end portion of the extended reflection portions 119b and the wavelength conversion efficiency of light by a wavelength conversion sheet and the multiple reflection is higher at the extending distal end portion than at the extending basal end portion. The color exhibit members 123 exhibit a tint that is closer to the tint of the light emitted by the LEDs 117 at the extending distal end portion than at the extending basal end portion. Therefore, unevenness in color is less likely to be caused between the extending distal end portion and the extending basal end portion of the extended reflection portions 119b.

Third Embodiment

A third embodiment of the present invention will be described with reference to FIGS. 9 and 10. In the third embodiment, color exhibit members 223 are disposed on long-side extended reflection portions 219bB in the configuration of the first embodiment. Configurations, operations, and effects similar to those of the first embodiment will not be described.

Figure 9:
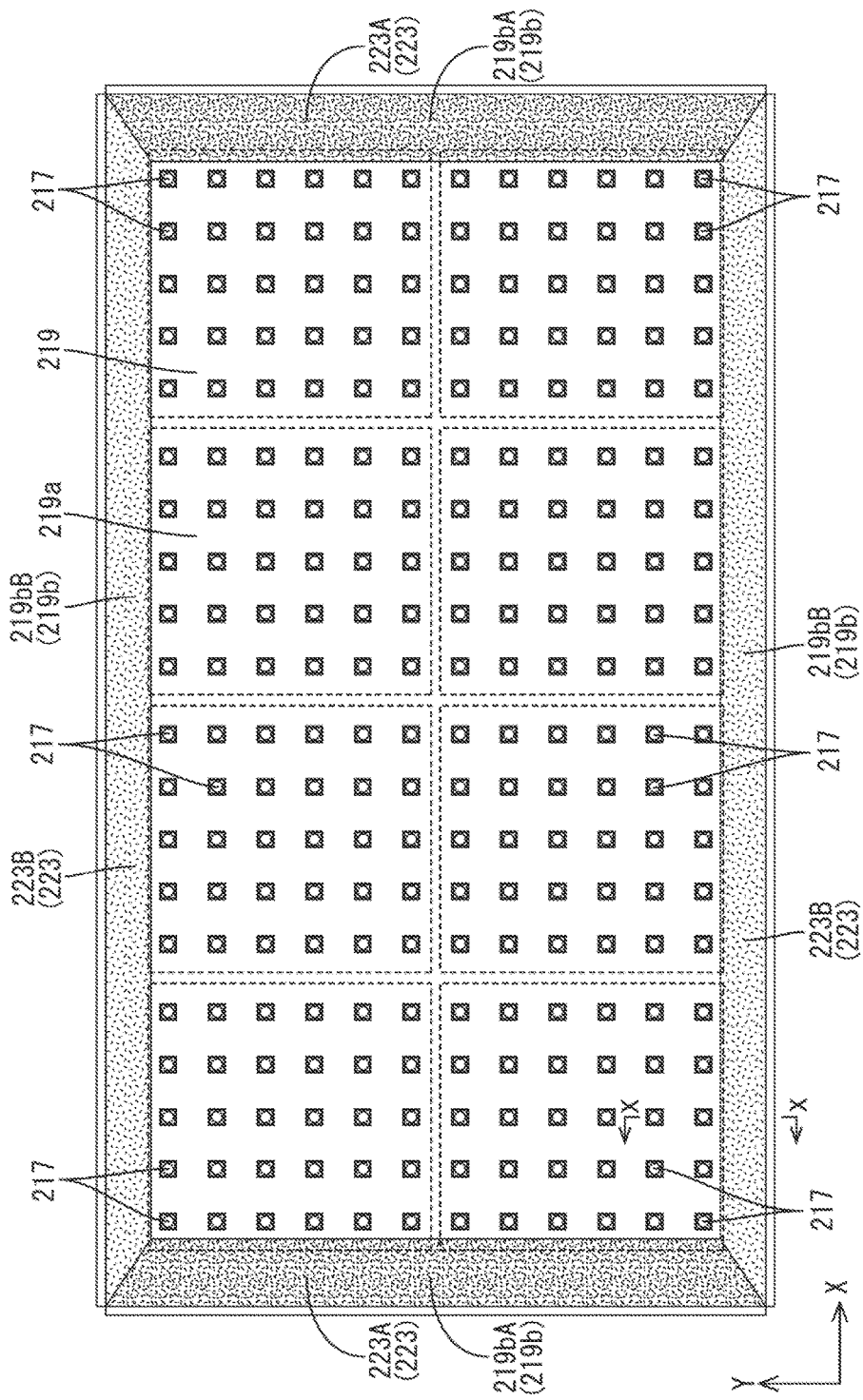
FIG. 9 is a plan view of a backlight device according to a third embodiment of the present invention.
Figure 10:
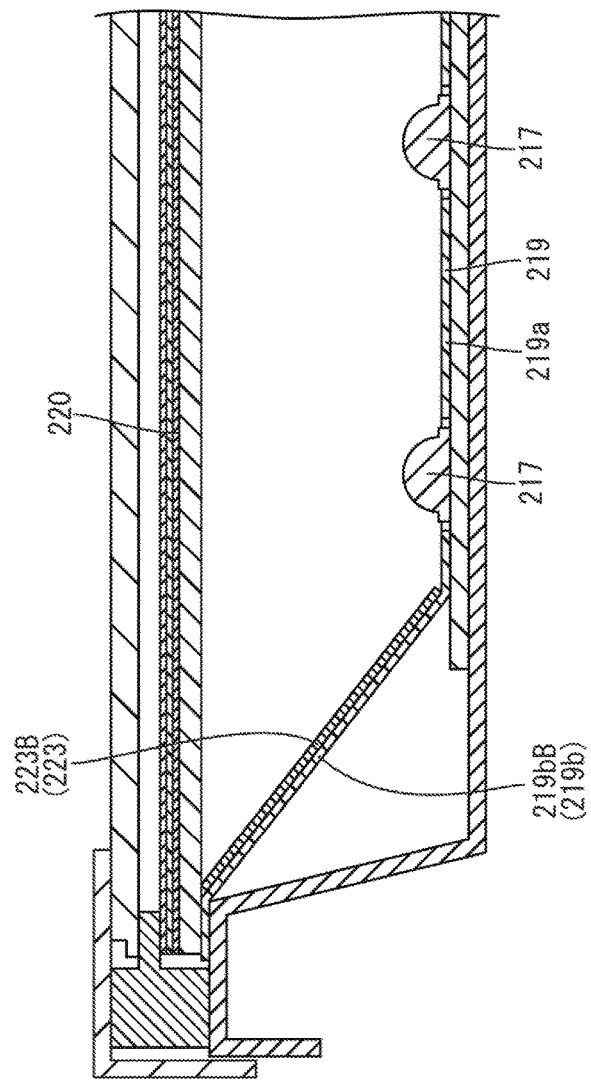
FIG. 10 is a cross-sectional view taken along line x-x in FIG. 9.

As illustrated in FIGS. 9 and 10, a reflection sheet 219 of this embodiment includes the color exhibit members 223 on a pair of short-side extended reflection portions 219bA and a pair of long-side extended reflection portions 219bB. Namely, the color exhibit members 223 are disposed on all the extended reflection portions 219b of the reflection sheet 219. Hereinafter, the color exhibit members 223 disposed on the short-side extended reflection portions 219bA are referred to as short-side color exhibit members (a first color exhibit member) represented by the symbol with "A" and the color exhibit members 223 disposed on the long-side extended reflection portions 219bB are referred to as long-side color exhibit members (a second color exhibit member) represented by the symbol with "B", and the color exhibit members 223 are not provided with added alphabets used as a generic term. In FIG. 9, a portion where the color exhibit member 223 is formed is illustrated with shading and a density of bluish color is represented by the density of the shading. Namely, as the density of the shading is increased in FIG. 9, the bluish tint is darker, and as the density of the shading is decreased, the bluish tint is lighter.

As illustrated in FIG. 9, the long-side color exhibit members (the second color exhibit member) 223B disposed on the long-side extended reflection portions 219bB exhibit a bluish tint on surfaces thereof that is relatively lighter than that of the short-side color exhibit members (the first color exhibit member) 223A disposed on the short-side extended reflection portions 219bA. Namely, the short-side color exhibit members 223A have surfaces having a tint that is relatively close to the tint (blue) of light emitted by LEDs 217 (the primary light) and the long-side color exhibit members 223B have surfaces having a tint that is relatively away from the tint of the light emitted by the LEDs 217 and close to the tint (white) of the surface of the bottom reflection portion 219a. As illustrated in FIGS. 9 and 10, the long-side color exhibit members 223B are disposed over substantially an entire area of each long-side extended reflection portion 219bB and are bonded on a front surface (a surface opposite a wavelength conversion sheet 220) of each of the long-side extended reflection portions 219bB so as to be integrally disposed on the respective long-side extended reflection portions 219bB. The density distribution of the coloring material coated over the reflection substrate is substantially constant over an entire area of each of the long-side color exhibit members 223B.

The long-side color exhibit members 223E are disposed on the respective long-side extended reflection portions 219bB such that unevenness in color that may be caused on the long-side extended reflection portions 219bB is preferably reduced. Further, the short-side color exhibit members 223A disposed on the short-side extended reflection portions 219bA, exhibit the tint closer to the tint of the light emitted by the LEDs 217 than the long-side color exhibit members 223B disposed on the long-side extended reflection portions 219bB. Accordingly, difference in tint between the reflected light reflecting off the short-side extended reflection portions 219bA and the reflected light reflecting off the long-side extended reflection portions 219bB is less likely to be caused and unevenness in color is preferably reduced.

As described before, according to this embodiment, the color exhibit members 223 are disposed on the long-side extended reflection portions 219bB and the color exhibit members disposed on the short-side extended reflection portions 219bA exhibit a tint that is relatively closer to the tint of light emitted by LEDs 217 than the color exhibit members disposed on the long-side extended reflection portions 219bB. The color exhibit members 223 are disposed on the respective long-side extended reflection portions 219bB such that unevenness in color that may be caused on the long-side extended reflection portions 219bB is preferably reduced. Further, the color exhibit members 223 disposed on the short-side extended reflection portions 219bA exhibit the tint closer to the tint of the light emitted by the LEDs 217 than the color exhibit members 223 disposed on the long-side extended reflection portions 219bB. Accordingly, difference in tint between the reflected light reflecting off the short-side extended reflection portions 219bA and the reflected light reflecting off the long-side extended reflection portions 219bB is less likely to be caused and unevenness in color is preferably reduced.

Fourth Embodiment

A fourth embodiment of the present invention will be described with reference to FIG. 11. In the fourth embodiment, a density distribution of coloring material contained in color exhibit members 323 is altered from the third embodiment to that of the second embodiment. Configurations, operations, and effects similar to those of the second and third embodiments will not be described.

Figure 11:
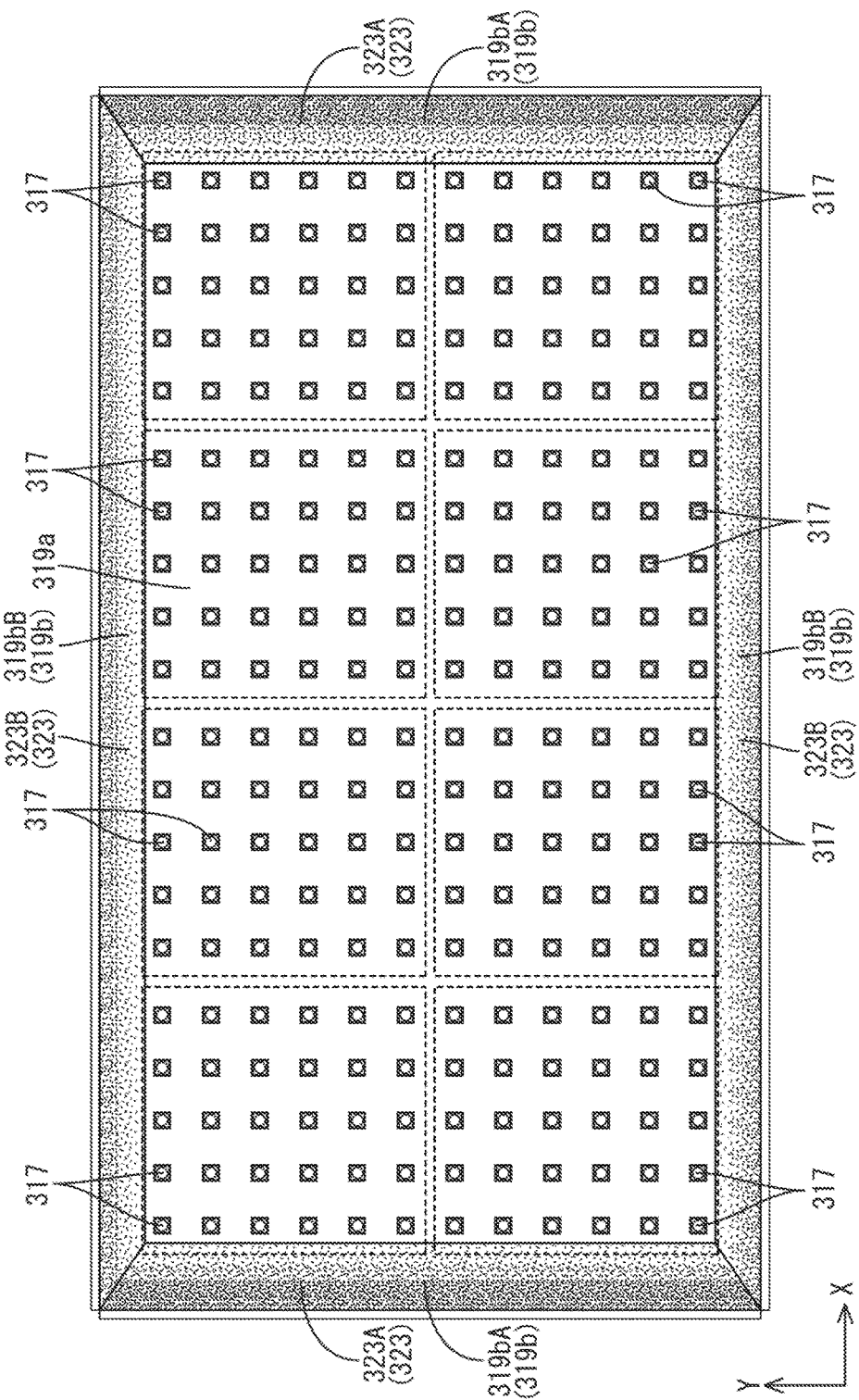
FIG. 11 is a plan view of a backlight device according to a fourth embodiment of the present invention.

As illustrated in FIG. 11, each of the color exhibit members 323 has a density distribution of the coloring material that changes within a plane surface of each reflection substrate. Specifically, the density of the coloring material contained in the color exhibit members 323 is changed according to a distance from a bottom reflection portion 319a. The density of the coloring material is lower as is closer to the bottom reflection portion 319a or closer to the extending basal end of each extended reflection portion 319b. The density of the coloring material is higher as is farther away from the bottom reflection portion 139a or closer to the extending distal end of each extended reflection portion 319b. Namely, the bluish tint of a surface of each color exhibit member 323 is lighter and closer to white that is a tint exhibited by the bottom reflection portion 319a as is closer to the extending basal end (the bottom reflection portion 319a) of each extended reflection portion 319b. The bluish tint of a surface of each color exhibit member 323 is darker and closer to the tint of light emitted by LEDs 317 as is closer to the extending distal end of each extended reflection portion 319b (farther away from the bottom reflection portion 319a). As the bluish tint of a surface of each color exhibit member 323 is darker, the color exhibit members 323 have higher reflectivity with respect to the blue light (the primary light) and a lower absorption rate with respect to the yellow light (green light and red light, the secondary light). As the bluish tint of a surface of each color exhibit member 323 is lighter, the color exhibit members 323 have lower reflectivity with respect to the blue light and a higher absorption rate with respect to the yellow light. Therefore, the color exhibit members 323 have lower reflectivity with respect to the blue light and a higher absorption rate with respect to the yellow light as is closer to the extending basal end of each extended reflection port on 319b. The color exhibit members 323 have higher reflectivity with respect to the blue light and a lower absorption rate with respect to the yellow light as is closer to the extending distal end of each extended reflection portion 319b. In the color exhibit members 323, the density of the coloring material and the bluish tint of the surfaces of the color exhibit member 323 are continuously and gradually changed from the extending basal end of each extended reflection portion 319b toward the extending distal end thereof.

As illustrated in FIG. 11, the bluish tint exhibited by long-side color exhibit members 323B at an extending basal end portion of a long-side extended reflection port on 319bB is lighter (lower reflectivity with respect to the blue light) than the bluish tint exhibited by short-side color exhibit members 323A at an extending basal end portion of a short-side extended reflection portion 319bA. The bluish tint exhibited by the long-side color exhibit members 323B at an extending distal end portion of the long-side extended reflection portion 319bB is lighter than the bluish tint exhibited by short-side color exhibit members 323A at an extending distal end portion of the short-side extended reflection portion 319bA. Namely, the long-side color exhibit members 323B exhibit a bluish tint on surfaces thereof that is lighter than a bluish tint of surfaces of the short-side color exhibit members 323A and reflectivity of the long-side color exhibit members 323B with respect to the blue light is relatively low. A changing rate of the density of a bluish tint on the surfaces of the short-side color exhibit members 323A and the long-side color exhibit members 323B may be equal to each other or may be different from each other. The density of the bluish tint on the surface of the extending basal end portion of the short-side color exhibit member 323A may be equal to or differ from the density of the bluish tint on the surface of the extending distal end portion of the long-side color exhibit member 323B. In FIG. 11, a portion where the color exhibit member 323 is formed is illustrated with shading and a density of bluish color is represented by the density of the shading. Namely, as the density at the shading is increased in FIG. 11, the bluish color is darker, and as the density of the shading is decreased, the bluish color is lighter.

Fifth Embodiment

A fifth embodiment of the present invention will be described with reference to FIG. 12. In the fifth embodiment, extended reflection portions 419b and color exhibit members 423 have configurations different from those in the third embodiment. Configurations, operations, and effects similar to those of the third embodiment will not be described.

Figure 12:
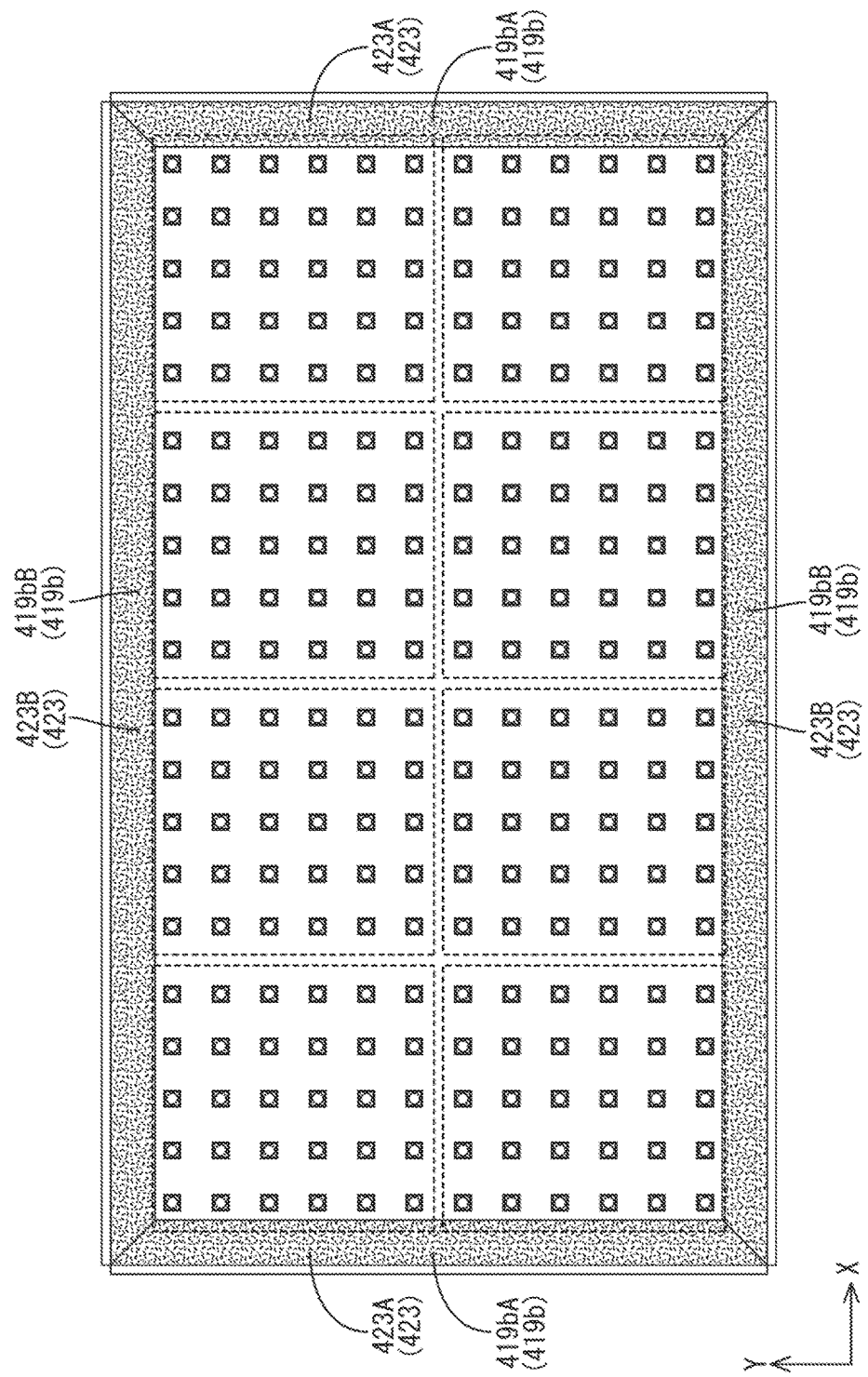
FIG. 12 is a plan view of a backlight device according to a fifth embodiment of the present invention.

As illustrated in FIG. 12, the extended reflection portions 419b according to this embodiment include short-side extended reflection portions 419bA and long-side extended reflection portions 419bB that are inclined with respect to a bottom reflection portion 419a at a substantially same inclination angle and have a substantially same plan view distance from an extending distal end to an extending basal end of the extended reflection portions 419b, that is, the bottom reflection portion 419a. The color exhibit members 423 include short-side color exhibit members 423A disposed on the respective short-side extended reflection portions 419bA and long-side color exhibit members 423E disposed on the respective long-side extended reflection portions 419bB. The density of coloring material coated on surfaces of reflection substrates, that is, a bluish tint of surfaces is similar to that on the short-side color exhibit members 423A and the long-side color exhibit members 423B. In FIG. 12, a portion where the color exhibit member 423 is formed is illustrated with shading and a density of bluish color is represented by the density of the shading. Namely, as the density of the shading is increased in FIG. 12, the bluish color is darker, and as the density of the shading is decreased, the bluish color is lighter.

Sixth Embodiment

A sixth embodiment of the present invention will be described with reference to FIG. 13. In the sixth embodiment, color exhibit members 523 are disposed in an area different from that of the first embodiment. Configurations, operations, and effects similar to those of the first embodiment will not be described.

Figure 13:
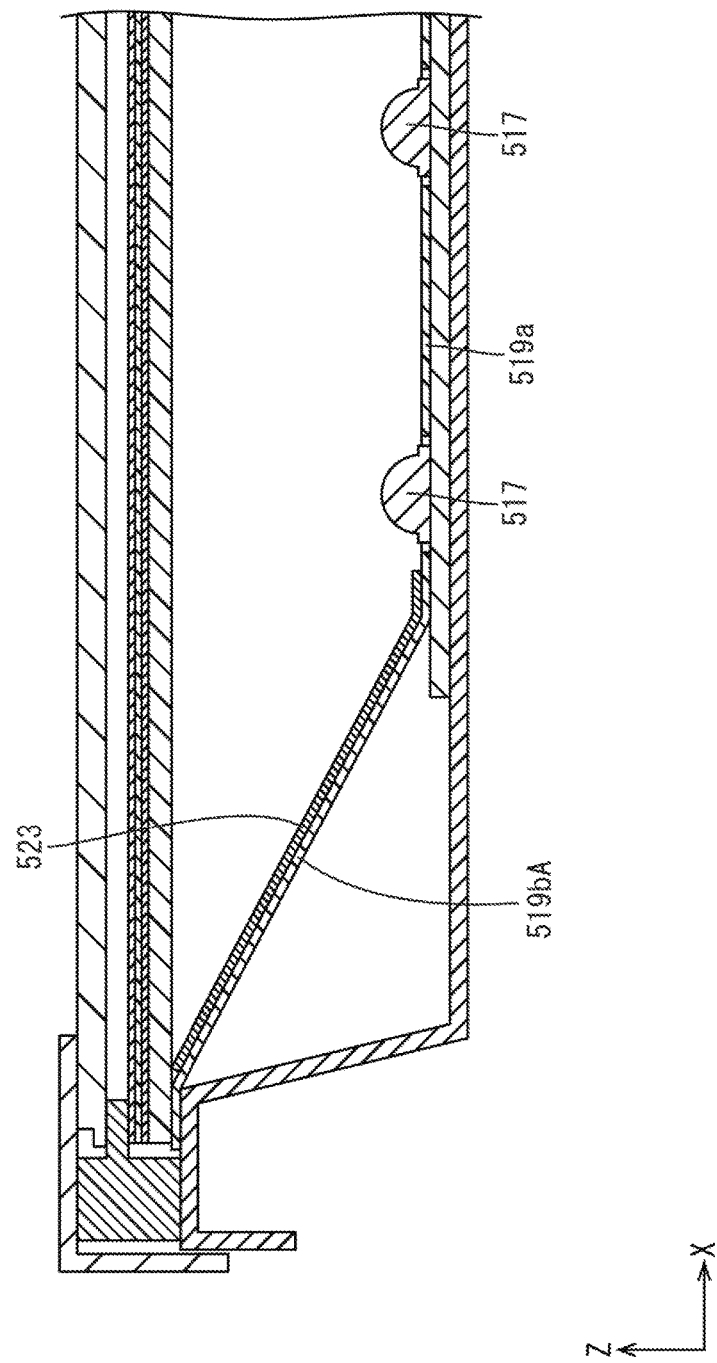
FIG. 13 is a cross-sectional view illustrating a cross-sectional configuration of a backlight device taken along a short-side direction according to a sixth embodiment of the present invention.

As illustrated in FIG. 13, the color exhibit members 523 according to this embodiment are disposed to extend from short-side extended reflection portion 519bA to a bottom reflection portion 519a. Specifically, the color exhibit members 523 are disposed on a substantially entire area of each of the short-side extended reflection portions 519bA and short-side outer edge portions of the bottom reflection portion 519a. The color exhibit members 523 extend across a border between each short-side extended reflection portion 519bA and the bottom reflection portion 519a. Each color exhibit member 523 has an inner edge that is on an outer side from an outermost LED 517 that is closest to an edge of the bottom reflection portion 519a (closest to the short-side extended reflection portion 519bA) within a plane surface thereof with respect to the long-side direction (the X-axis direction). The color exhibit member 523 does not overlap the outermost LED 517 in a plan view. According to such a configuration, unevenness in color is less likely to be caused in both of the short-side extended reflection portions 519bA and the bottom reflection portion 519a.

As described before, according to this embodiment, the color exhibit members 523 are disposed to extend from the short-side extended reflection portion (the extended reflection portion) 519bA to the bottom reflection portion 519a. Such a configuration is preferable in occurrence of unevenness in color in the short-side extended reflection portion 519bA and the bottom reflection portion 519a.

Seventh Embodiment

A seventh embodiment of the present invention will be described with reference to FIG. 14. In the seventh embodiment, color exhibit members 623 are disposed in an area different from that of the sixth embodiment. Configurations, operations, and effects similar to those of the sixth embodiment will not be described.

Figure 14:
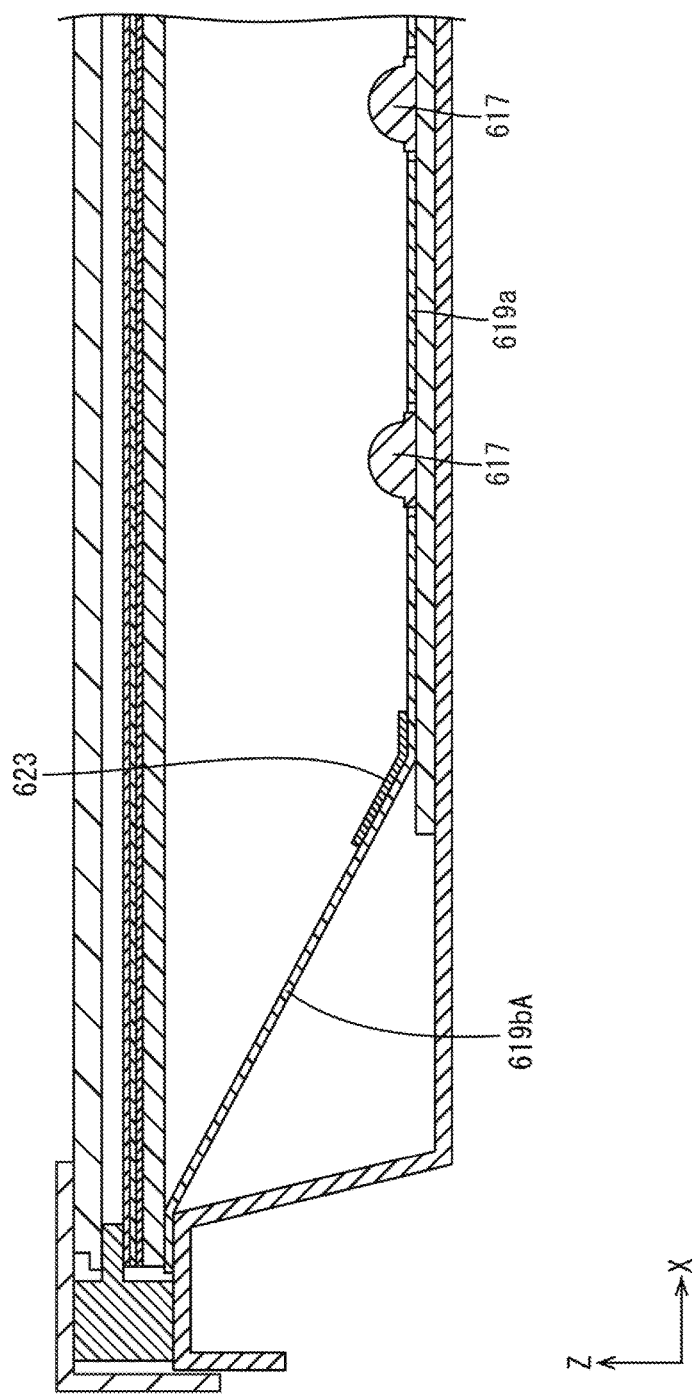
FIG. 14 is a cross-sectional view illustrating a cross-sectional configuration of a backlight device taken along a short-side direction according to a seventh embodiment of the present invention.

As illustrated in FIG. 14, the color exhibit members 623 according to this embodiment are disposed selectively on a border between a short-side extended reflection portion 619bA and a bottom reflection portion 619a. Specifically, each of the color exhibit members 623 is disposed on an extending basal end portion of each short-side extended reflection portion 619bA and each short-side outer edge portion of the bottom reflection portion 619a. The color exhibit members 623 extend across a border between each short-side extended reflection portion 619bA and the bottom reflection portion 619a. In this embodiment, a distance from the border between the short-side extended reflection portion 619bA and the bottom reflection portion 619a to an outermost LED 617 that is closest to an edge of the bottom reflection portion 619a (closest to the short-side extended reflection portion 619bA) with respect to the X-axis direction is greater than that of the sixth embodiment. According to such a configuration, unevenness in color may be caused locally in a portion near the border between the short-side extended reflection portion 619bA and the bottom reflection portion 619a. However, as described before, the color exhibit member 623 is selectively disposed on the border between the short-side extended reflection portion 619bA and the bottom reflection portion. 619a such that unevenness in color is preferably reduced.

As described before, according to this embodiment, the color exhibit member 623 is selectively disposed on the border between the short-side extended reflection portion 619bA and the bottom reflection portion 619a. If a distance from the border between the short-side extended reflection portion 619bA and the bottom reflection portion 619a to the LED 617 is large, unevenness in color may be caused locally in a portion near the border between the short-side extended reflection portion 619bA and the bottom reflection portion 619a. However, the color exhibit member 623 is selectively disposed on the border between the short-side extended reflection portion 619bA and the bottom reflection portion 619a such that uneveness in color is preferably reduced.

Eighth Embodiment

An eighth embodiment of the present invention will be described with reference to FIG. 15. In the eighth embodiment, a method of disposing color exhibit members 723 on short-side extended reflection portions 719bA differs from that in the first embodiment. Configurations, operations, and effects similar to those of the first embodiment will not be described.

Figure 15:
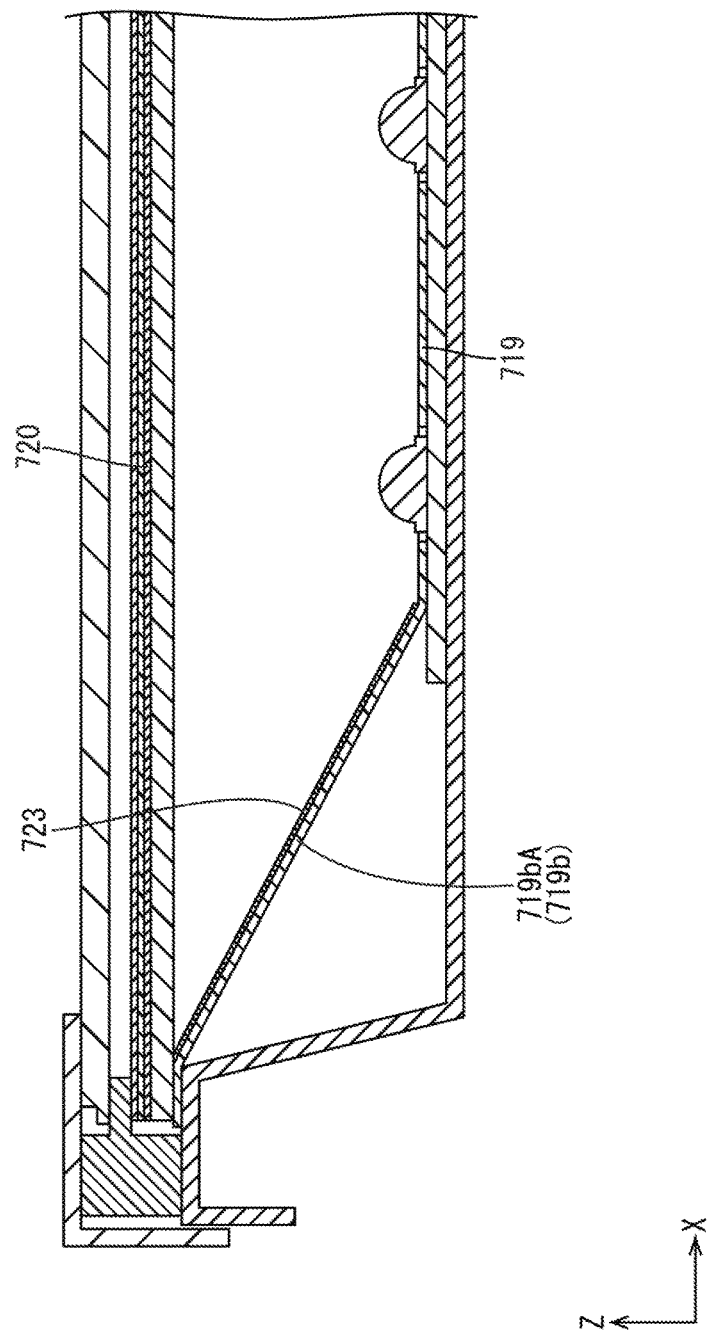
FIG. 15 is a cross-sectional view illustrating a cross-sectional configuration of a backlight device taken along a short-side direction according to an eighth embodiment of the present invention.

As illustrated in FIG. 15, the color exhibit members 723 are disposed on the short-side extended reflection portions 719bA by coating a surface of each of the short-side extended reflection portions 719bA (including surface opposite a wavelength conversion sheet 720) with coloring material that exhibits blue. Specific methods of coating the surfaces of the short-side extended reflection portions 719bA with the color exhibit members 723 include a screen printing method, an ink jetting printing method, a spray coating method, and a roller coating method. According to such a method, a manufacturing cost is reduced compared to a method of manufacturing reflection sheets having different light absorption rates and reflectivity for each of the short-side extended reflection portions and the bottom reflection portion. A reflection sheet 719 can be used without being coated with the color exhibit members 723, and the reflection sheet 719 is commonly used for the reflection sheet 719 including the color exhibit members 723 and the reflection sheet 719 without including the color exhibit members 723.

As described before, according to this embodiment, the color exhibit members 723 are disposed at least on the wavelength conversion sheet 720 side surface of the short-side extended reflection portion (extended reflection portion) 719bA with coating. Accordingly, a manufacturing cost is reduced compared to a method of manufacturing reflection sheets having different light absorption rates and reflectivity for each of the short-side extended reflection portions and the bottom reflection portion. A reflection sheet 719 can be used without being coated with the color exhibit members 723, and the reflection sheet 719 is commonly used for the reflection sheet 719 including the color exhibit members 723 and the reflection sheet 719 without including the color exhibit members 723.

Ninth Embodiment

A ninth embodiment of the present invention will be described with reference to FIG. 16. The ninth embodiment differs from the third embodiment in that color exhibit members 823 are disposed also on a bottom reflection portion 819a. Configurations, operations, and effects similar to those of the third embodiment will not be described.

As illustrated in FIG. 16, the color exhibit members 823 are disposed on a pair of short-side extended reflection portions 819bA, a pair of long-side extended reflection portions 819bB, and the bottom reflection portion 819a. Namely, the color exhibit members 823 are disposed on an entire area of a reflection sheet 819. Hereinafter, the color exhibit members 823 disposed on the short-side extended reflection portions 819bA are referred to as short-side color exhibit members (a first color exhibit member) represented by the symbol with "A", and the color exhibit members 823 disposed on the long-side extended reflection portions 819bB are referred to as long-side color exhibit members (a second color exhibit member) represented by the symbol with "B", and the color exhibit member 823 disposed on the bottom reflection portion 819a are referred to as a bottom color exhibit member (a third color exhibit member) represented by the symbol with "C", and the color exhibit members 823 are not provided with added alphabets used as a generic term. In FIG. 16, a portion where the color exhibit member 823 is formed is illustrated with shading and a density of bluish tint is represented by the density of the shading. Namely, as the density of the shading is increased in FIG. 16, the bluish tint is darker, and as the density of the shading is decreased, the bluish tint is lighter.

As illustrated in FIG. 16, a bluish tint of a surface of the bottom color exhibit member (the third color exhibit member) 823 disposed on the bottom reflection portion 819a is relatively lighter than that of a surface of each of the long-side color exhibit members (the second color exhibit members) 823B disposed on the long-side extended reflection portions 819bB. Namely, a tint of the surface of each loner-side color exhibit member 823B is closer to a tint (blue) of the light from LEDs 817 (the primary light) compared to that of the bottom color exhibit portion 823C. A tint of the surface of the bottom color exhibit portion 823C is farther away from the tint of the light from the LEDs 817 compared to that of the long-side color exhibit members 823B. Therefore, the bluish tint of the surfaces of the color exhibit members 823 is closer to the tint of the light from the LEDs 817 in a stepwise manner from the bottom color exhibit member 823C, the long-side color exhibit members 823B, and the short-side color exhibit members (the first color exhibit members) 8234A in this order. The bottom color exhibit member 823C extends over a substantially entire area of the bottom reflection portion 819a and is bonded on a front surface (opposite a wavelength conversion sheet) of the bottom reflection portion 819a to be provided integrally with the bottom reflection portion 819a. A density distribution of a coloring material coated on a reflection substrate is substantially constant in an entire area of the bottom color exhibit member 823C.

OTHER EMBODIMENTS

The present invention is not limited to the embodiments, which have been described using the foregoing descriptions and the drawings. For example, embodiments described below are also included in the technical scope of the present invention.

(1) In each of the above embodiments (except for the eighth embodiment), the color exhibit members are provided by coating a surface of the reflection substrate with the coloring material. The color exhibit member may be configured by a substrate having light transmissivity such as a semitransparent substrate and coloring agent selectively absorbing light rays in a specific wavelength region contained in the substrate at a certain density. In such a configuration, the color exhibit members have a function of absorbing selectively light rays in the specific wavelength region and the extended reflection portions have a function of reflecting light rays from the LEDs. Specifically, the material of the semitransparent substrate of the color exhibit member may be cellophane and the coloring agent contained in the semitransparent substrate may be coloring agent exhibiting blue (a color close to the light from the LED).

(2) In each of the above embodiments, the LEDs emitting light of a single blue color are used as the light source. LEDs emitting light of other color than blue may be used and the color exhibited by the color exhibit member may be altered according to the color of light from the LEDs. For example, LEDs emitting magenta light may be used and the color exhibit members having a surface exhibiting magenta may be used. Such color exhibit members have an absorption rate with respect to magenta light relatively lower than the absorption rate with respect to green light that makes a complementary color pair with magenta light and reflectivity with respect to the magenta light relatively higher than reflectivity with respect to the green light that makes a complementary color pair with magenta light. In such a configuration, the green phosphors may be used as the phosphor to be contained in the wavelength conversion sheet such that illumination light (exit light) from the backlight device can be whitened.

(3) Other than the above embodiment (2), LEDs emitting purple light and a color exhibit member having a surface that exhibit purple may be used. Such color exhibit members have an absorption rate with respect to purple light relatively lower than the absorption rate with respect to yellowish green light that makes a complementary color pair with purple light and reflectivity with respect to the purple light relatively higher than reflectivity with respect to the yellowish green light that makes a complementary color pair with purple light. In such a configuration, the yellow phosphors and the green phosphors may be used as the phosphor to be contained in the wavelength conversion sheet at a certain content ratio such that illumination light (exit light) from the backlight device can be whitened.

(4) Other than the above embodiments (2), (3), LEDs emitting cyan light and a color exhibit member having a surface that exhibits cyan may be used. Such color exhibit members have an absorption rate with respect to cyan light relatively lower than the absorption rate with respect to red light that makes a complementary color pair with cyan light and reflectivity with respect to the cyan light relatively higher than reflectivity with respect to the red light that makes a complementary color pair with cyan light. In such a configuration, the red phosphors may be used as the phosphor to be contained in the wavelength conversion sheet such that illumination light (exit light) from the backlight device can be whitened.

(5) The above embodiments include the configuration in that an inclination angle between the short-side extended reflection portion and the bottom reflection portion is smaller than an inclination angle between the long-side extended reflection portion, the configuration in that the bottom reflection portion and the plan view distance from the extending distal end to the extending basal end is longer in the short-side extended reflection portion than in the long-side extended reflection portion, and the configuration in that the inclination angles and the plan view distances are equal. However, the long-side extended reflection portion may be configured such that a plan view distance from the extending distal end to the extending basal end is longer than that in the short-side extended reflection portion. In such a configuration, the color exhibit member is preferably disposed at least on the long-side extended reflection portion to effectively reduce unevenness in color.

(6) In each of the above embodiments, the extended reflection portions are inclined with respect to the bottom reflection portion and extend in a straight line. The extended reflection portions may extend with being curved (in an arched shape) from the bottom reflection portion.

(7) Other than each of the above embodiments, a layered order of the wavelength conversion sheet, the prism sheet, and the reflection type polarizing sheet included in the optical member may be altered, if necessary. The number and the kind of the optical sheets may be altered, if necessary. The number of the diffuser plates included in the optical member may be altered or no diffuser plate may be included.

(8) In the seventh embodiment, the color exhibit member is selectively disposed on the border so as to cross the border between the extended reflection portion and the bottom reflection portion. For example, the color exhibit member may be selectively disposed on the extending basal end portion of the extended reflection portion without crossing the border between the extended reflection portion and the bottom reflection portion. The color exhibit member may be selectively disposed on the extending distal end portion of the extended reflection portion. The color exhibit member may be selectively disposed on an extending middle portion of the extended reflection portion.

(9) The configuration described in the sixth and seventh embodiments may be combined with the configuration described in one of the second to fifth embodiments, the eighth embodiment, and the ninth embodiment. In a combination of the configuration of the sixth and seventh embodiments and one of the third to fifth embodiments, the long-side color exhibit portion extends from the long-side extended reflection portion to the bottom reflection portion. Specifically, the long-side color exhibit members are disposed on a substantially entire area of each of the long-side extended reflection portions and the long-side outer edge portions of the bottom reflection portion. The long-side color exhibit members extend across the border between each of the long-side extended reflection portions and the bottom reflection portion.

(10) Other than the sixth and seventh embodiments, a specific area of the extended reflection portions and the bottom reflection portion where the color exhibit members are disposed may be altered, if necessary.

(11) The configuration described in the eighth embodiment may be combined with the configuration of the second to fifth embodiments and the ninth embodiment.

(12) The configuration described in the ninth embodiment may be combined with the configuration of the fourth and fifth embodiments.

(13) In each of the above embodiments, the wavelength conversion sheet contains the green phosphors and the red phosphors. However, the wavelength conversion sheet may contain only the yellow phosphors or may contain the red phosphors or the green phosphors in addition to the yellow phosphors.

(14) In each of the above embodiments, the quantum dot phosphors used for the phosphors contained in the wavelength conversion sheet are the core-shell type quantum dot phosphors including CdSe and ZnS. However, core type quantum dot phosphors each having a single internal composition may be used. For example, a material (CdSe, CdS, ZnS) prepared by combining Zn, Cd, Hg, or Pb that could be a divalent cation with O, S, Se, or Te that could be a dianion may be singly used. A material (indium phosphide (InP), gallium arsenide (GaAs)) prepared by combining Ga or In that could be a tervalent cation with P, As, or Sb that could be a tervalent anion or chalcopyrite type compounds (CuInSe2) may be singly used. Other than the core-shell type quantum dot phosphors and the core type quantum dot phosphors, alloy type quantum dot phosphors may be used. Furthermore, quantum dot phosphors that do not contain cadmium may be used.

(15) In each of the above embodiments, the quantum dot phosphors used for the phosphors contained in the wavelength conversion sheet are the core-shell type quantum dot phosphors including CdSe and ZnS. However, core-shell type quantum dot phosphors including a combination of other materials may be used.

(16) In each of the above embodiments, the quantum dot phosphors are contained in the wavelength conversion sheet. Other types of phosphors may be contained in the wavelength conversion sheet. For example, sulfide phosphors may be used for the phosphors contained in the wavelength conversion sheet. Specifically, $SrGa_2S_4:Eu^{2+}$ may be used for the green phosphors and $(Ca, Sr, Ba) S:Eu^{2+}$ may be used for the red phosphors.

(17) Other than the above (16), $(Ca, Sr, Ba)_3SiO_4:Eu^{2+}$, β-SiAlON: $Eu^{2+}$, or $Ca_3Sc_2Si_3O_{12}:Ce^{3+}$ may be used for the green phosphors contained in the wavelength conversion sheet. $(Ca, Sr, Ba)_2SiO_5N_8:Eu^{2+}$, or $CaAlSiN_3: Eu^{2+}$ may be used for the red phosphors contained in the wavelength converting sheet. $(Y, Gd)_3(Al, Ga)_5O_{12}:Ce^{3+}$ (so-called YAG:$Ce^{3+}$), α-SiAlON: $Eu^{2+}$, or $(Ca, Sr, Br)_3SiO_4:Eu^{2+}$ may be used for the yellow phosphors contained in the wavelength conversion sheet. Further, a complex fluoride fluorescent material (e.g., manganese-activated potassium fluorosilicate ($K_2TiF_6$)) may be used for the phosphors contained in the wavelength conversion sheet.

(18) Other than the above (16) and (17), organic phosphors may be used for the phosphors contained in the wavelength conversion sheet. The organic phosphors may be low molecular organic phosphors including triazole or oxadiazole as a basic skeleton.

(19) Other than the above (16), (17), and (18), phosphors configured to perform wavelength conversion through energy transfer via dressed photons (near-field light) may be used for the phosphors contained in the wavelength conversion sheet. Preferable phosphors of this kind may be phosphors including zinc oxide quantum dots (ZnO-QD) with diameters from 3 nm to 5 nm (preferably about 4 nm) and DCM pigments dispersed in the zinc oxide quantum dots.

(20) Other than each of the above embodiments, the emission spectrum of the LEDs (peak wavelengths, half width of each peak) and the emission spectrum of the phosphors contained in the phosphor layer (peak wavelengths, half width of each peak) may be altered as appropriate.

(21) In each of the above embodiments, InGaN is used for the material of the LED components in the LEDs. However, GaN, AlGaN, GaF, ZnSe, ZnO, or AlGaInP may be used for the material of the LED components.

(22) In each of the above embodiments, the chassis is made of metal. However, the chassis may be made of synthetic resin.

(23) In each of the above embodiments, the optical member is pressed from the front side by the frame and held between the frame and the receiver plate of the chassis. For example, the optical member may be supported by the frame from the rear side so as not press the optical member from the front side.

(24) In each of the above embodiments, the LEDs are used as the light source. However, other light sources such as an organic EL may be used.

(25) In each of the above embodiments, the liquid crystal panel and the chassis are arranged in a vertical position such that the short-side direction thereof matches the vertical direction. However, the liquid crystal panel and the chassis may be arranged in a vertical position such that the long-side direction thereof matches the vertical direction.

(26) In each of the above embodiments, the TFTs are used as switching components of the liquid crystal display device. However, switching components other than the TFTs (such as thin film diodes (TFDs)) may be included in the scope of the present invention. Furthermore, a liquid crystal display device configured to display black and white images other than the liquid crystal display device configured to display color images.

(27) In each of the above embodiments, the transmissive-type liquid crystal display device is described. However, a reflection-type liquid crystal display device and a semitransmissive type liquid crystal display device may be included in the scope of the present invention.

(28) In each of the above embodiments, the liquid crystal display device including the liquid crystal panel as the display panel is used. The present invention may be applied to display devices including other type of display panel.

(29) In each of the above embodiments, the television device including the tuner is included. However, a display device without including a tuner may be included in the scope of the present invention. Specifically, the present invention may be applied to liquid crystal display devices used as digital signage or an electronic blackboard.

EXPLANATION OF SYMBOLS

10: liquid crystal display device (display device), 10TV: television device, 11: liquid crystal panel (display panel), 12: backlight device (lighting device), 14: chassis, 14a: bottom plate (bottom portion), 17, 117, 217, 317, 417, 517, 617, 817: LED (light source), 17a: light emission surface, 19, 219, 719, 819: reflection sheet (reflection member), 19a, 119a, 219a, 319a, 519a, 619a, 819a: bottom reflection portion, 19b, 219b, 319b, 419b, 719b, 819b: extended reflection portion, 19bA, 119bA, 219bA, 319bA, 419bA, 819bA, 619bA, 710bA, 819bA: short-side extended reflection portion (first extended reflection portion), 19bB, 219bB, 319bB, 419bB, 819bB: long-side extended reflection portion extended reflection portion), 20, 220, 720: wavelength conversion sheet (wavelength conversion member), 23, 123, 223, 323, 423, 523, 623, 723, 823: color exhibit member

The invention claimed is:

1. A lighting device comprising:
a light source having a light emission surface;
a chassis including a bottom portion that is disposed on an opposite side of the light source from the light emission surface, and the chassis having the light source therein;
a wavelength conversion member disposed opposite the light emission surface of the light source and away from the light emission surface on a light exit side and containing phosphors for converting wavelength of light emitted by the light source;
a reflection member configured to reflect the light emitted by the light source toward the wavelength conversion member, the reflection member including at least a bottom reflection portion disposed along the bottom portion, and an extended reflection portion extending from the bottom reflection portion toward the wavelength conversion member; and
a color exhibit member disposed on at least a portion of the extended reflection portion and configured to exhibit a tint closer to a tint of the light emitted by the light source in comparison to the bottom reflection portion.

2. The lighting device according to claim 1, wherein the color exhibit member has a light absorption rate with respect to light having a color that makes a complementary color pair with the light emitted by the light source higher than a light absorption rate with respect to the light emitted by the light source.

3. The lighting device according to claim 1, wherein the color exhibit member has light reflectivity with respect to light having a color that makes a complementary color pair with the light emitted by the light source relatively higher than light reflectivity with respect to the light emitted by the light source.

4. The lighting device according to claim 1, wherein the color exhibit member has a film shape and adheres to at least a surface of the extended reflection portion opposite the wavelength conversion sheet.

5. The lighting device according to claim 1, wherein the color exhibit member is disposed on at least a surface of the extended reflection portion opposite the wavelength conversion sheet with coating.

6. The lighting device according to claim 1, wherein the color exhibit member on an extending distal end side of the extended reflection portion exhibits a tint closer to a tint of the light emitted by the light source than the color exhibit member on an extending basal end side of the extended reflection portion.

7. The lighting device according to claim 1, wherein
the extended reflection portion includes at least a first extended reflection portion and a second extended reflection portion,
the first extended reflection portion is inclined with respect to the bottom reflection portion at a relatively small inclination angle,
the second extended reflection portion is inclined with respect to the bottom reflection portion at a relatively great inclination angle, and
the color exhibit member is disposed at least on the first extended reflection portion.

8. The lighting device according to claim 7, wherein
the color exhibit member is disposed on the second extended reflection portion, and
the color exhibit member disposed on the first extended reflection portion exhibits a tint closer to the tint of the light emitted by the light source than a tint exhibited by the color exhibit member disposed on the second extended reflection portion.

9. The lighting device according to claim 1, wherein the color exhibit member extends from the extended reflection portion to the bottom reflection portion.

10. The lighting device according to claim 9, wherein the color exhibit member is selectively disposed on a border between the extended reflection portion and the bottom reflection portion.

11. The lighting device according to claim 1, wherein the color exhibit member is disposed over an entire area of the extended reflection portion.

12. The lighting device according to claim 1, wherein
the light source is configured to emit blue light,
the wavelength conversion member contains as the phosphors at least a green phosphor that converts the blue light into green light through wavelength conversion and a red phosphor that converts the blue light into red light through wavelength conversion, and
the color exhibit member is configured to exhibit a bluish tint in comparison to a tint exhibited by the bottom reflection portion.

13. The lighting device according to claim 1, wherein the wavelength conversion member contains quantum dot phosphors as the phosphors.

14. A display device comprising:
the lighting device according to claim 1; and
a display panel displaying images using light from the lighting device.

15. A television device comprising the display device according to claim 14.

* * * * *